United States Patent
Melanson et al.

(10) Patent No.: US 8,576,589 B2
(45) Date of Patent: *Nov. 5, 2013

(54) SWITCH STATE CONTROLLER WITH A SENSE CURRENT GENERATED OPERATING VOLTAGE

(75) Inventors: John L. Melanson, Austin, TX (US); Karl Thompson, Converse, TX (US); Kartik Nanda, Austin, TX (US); Mauro Gaetano, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 396 days.

This patent is subject to a terminal disclaimer.

(21) Appl. No.: 12/165,556

(22) Filed: Jun. 30, 2008

(65) Prior Publication Data

US 2009/0189579 A1 Jul. 30, 2009

Related U.S. Application Data

(60) Provisional application No. 61/024,587, filed on Jan. 30, 2008.

(51) Int. Cl.
*H02M 1/36* (2007.01)
(52) U.S. Cl.
USPC ............................ 363/49; 323/207; 363/89
(58) Field of Classification Search
USPC .................. 363/49, 89, 84; 323/207, 299, 901
See application file for complete search history.

(56) References Cited

U.S. PATENT DOCUMENTS

| | | |
|---|---|---|
| 3,316,495 A | 4/1967 | Sherer |
| 3,423,689 A | 1/1969 | Miller et al. |
| 3,586,988 A | 6/1971 | Weekes |
| 3,725,804 A | 4/1973 | Langan |
| 3,790,878 A | 2/1974 | Brokaw |

(Continued)

FOREIGN PATENT DOCUMENTS

| | | |
|---|---|---|
| CN | 1292598 A | 4/2001 |
| DE | 19713814 | 10/1998 |

(Continued)

OTHER PUBLICATIONS

Linear Technology, "Single Switch PWM Controller with Auxiliary Boost Converter," LT1950 Datasheet, Linear Technology, Inc. Milpitas, CA, 2003.

(Continued)

*Primary Examiner* — Harry Behm
(74) *Attorney, Agent, or Firm* — Terrile, Cannatti, Chambers & Holland, LLP; Kent B. Chambers

(57) ABSTRACT

A power supply system and method includes a switch state controller that is operational to control a switching power converter during certain power loss conditions that cause conventional switch state controllers to have diminished or no functionality. In at least one embodiment, during certain power loss conditions, such as when an auxiliary power supply is in standby mode or when the switching power converter is not operating, a power supply for the switch state controller does not provide sufficient operating power to the switch state controller during certain power loss conditions. In at least one embodiment, during such power loss conditions power is generated for the switch state controller using sense input and/or sense output currents of the switching power converter to allow an integrated circuit (IC) switch state controller to generate a control signal to control a switch of the switching power converter.

30 Claims, 11 Drawing Sheets

(56) References Cited

U.S. PATENT DOCUMENTS

| | | | |
|---|---|---|---|
| 3,881,167 A | 4/1975 | Pelton et al. |
| 4,075,701 A | 2/1978 | Hofmann |
| 4,334,250 A | 6/1982 | Theus |
| 4,409,476 A | 10/1983 | Lofgren et al. |
| 4,414,493 A | 11/1983 | Henrich |
| 4,476,706 A | 10/1984 | Hadden et al. |
| 4,523,128 A | 6/1985 | Stamm et al. |
| 4,677,366 A | 6/1987 | Wilkinson et al. |
| 4,683,529 A | 7/1987 | Bucher |
| 4,700,188 A | 10/1987 | James |
| 4,737,658 A | 4/1988 | Kronmuller et al. |
| 4,797,633 A | 1/1989 | Humphrey |
| 4,937,728 A | 6/1990 | Leonardi |
| 4,940,929 A | 7/1990 | Williams |
| 4,973,919 A | 11/1990 | Allfather |
| 4,979,087 A | 12/1990 | Sellwood et al. |
| 4,980,898 A | 12/1990 | Silvian |
| 4,992,919 A | 2/1991 | Lee et al. |
| 4,994,952 A | 2/1991 | Silva et al. |
| 5,001,620 A | 3/1991 | Smith |
| 5,055,746 A | 10/1991 | Hu et al. |
| 5,109,185 A | 4/1992 | Ball |
| 5,121,079 A | 6/1992 | Dargatz |
| 5,206,540 A | 4/1993 | de Sa e Silva et al. |
| 5,264,780 A | 11/1993 | Bruer et al. |
| 5,278,490 A | 1/1994 | Smedley |
| 5,319,301 A | 6/1994 | Callahan |
| 5,321,350 A | 6/1994 | Haas |
| 5,323,157 A | 6/1994 | Ledzius et al. |
| 5,359,180 A | 10/1994 | Park et al. |
| 5,383,109 A | 1/1995 | Maksimovic et al. |
| 5,424,932 A | 6/1995 | Inou et al. |
| 5,477,481 A | 12/1995 | Kerth |
| 5,479,333 A | 12/1995 | McCambridge et al. |
| 5,481,178 A | 1/1996 | Wilcox et al. |
| 5,565,761 A | 10/1996 | Hwang |
| 5,589,759 A | 12/1996 | Borgato et al. |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,768,111 A | 6/1998 | Zaitsu |
| 5,770,928 A | 6/1998 | Chansky |
| 5,781,040 A | 7/1998 | Myers |
| 5,783,909 A | 7/1998 | Hochstein |
| 5,798,635 A | 8/1998 | Hwang et al. |
| 5,834,858 A | 11/1998 | Crosman et al. |
| 5,874,725 A | 2/1999 | Yamaguchi |
| 5,900,683 A | 5/1999 | Rinehart et al. |
| 5,912,812 A | 6/1999 | Moriarty, Jr. |
| 5,929,400 A | 7/1999 | Colby et al. |
| 5,946,202 A | 8/1999 | Balogh |
| 5,946,206 A | 8/1999 | Shimizu et al. |
| 5,952,849 A | 9/1999 | Haigh et al. |
| 5,960,207 A | 9/1999 | Brown |
| 5,962,989 A | 10/1999 | Baker |
| 5,963,086 A | 10/1999 | Hall |
| 5,966,297 A | 10/1999 | Minegishi |
| 5,994,885 A | 11/1999 | Wilcox et al. |
| 6,016,038 A | 1/2000 | Mueller et al. |
| 6,043,633 A | 3/2000 | Lev et al. |
| 6,043,635 A | 3/2000 | Downey |
| 6,072,969 A | 6/2000 | Yokomori et al. |
| 6,083,276 A | 7/2000 | Davidson et al. |
| 6,084,450 A | 7/2000 | Smith et al. |
| 6,091,233 A | 7/2000 | Hwang et al. |
| 6,125,046 A * | 9/2000 | Jang et al. .................. 363/21.15 |
| 6,150,774 A | 11/2000 | Mueller et al. |
| 6,160,724 A | 12/2000 | Hemena et al. |
| 6,181,114 B1 | 1/2001 | Hemena et al. |
| 6,211,626 B1 | 4/2001 | Lys et al. |
| 6,211,627 B1 | 4/2001 | Callahan |
| 6,229,271 B1 | 5/2001 | Liu |
| 6,229,292 B1 | 5/2001 | Redl et al. |
| 6,246,183 B1 | 6/2001 | Buonavita |
| 6,259,614 B1 * | 7/2001 | Ribarich et al. ................ 363/89 |
| 6,300,723 B1 | 10/2001 | Wang et al. |
| 6,304,066 B1 | 10/2001 | Wilcox et al. |
| 6,304,473 B1 | 10/2001 | Telefus et al. |
| 6,343,026 B1 | 1/2002 | Perry |
| 6,344,811 B1 | 2/2002 | Melanson |
| 6,369,525 B1 | 4/2002 | Chang et al. |
| 6,385,063 B1 | 5/2002 | Sadek et al. |
| 6,407,514 B1 | 6/2002 | Glaser et al. |
| 6,407,515 B1 | 6/2002 | Hesler |
| 6,407,691 B1 | 6/2002 | Yu |
| 6,441,558 B1 | 8/2002 | Muthu et al. |
| 6,445,600 B2 | 9/2002 | Ben-Yaakov |
| 6,452,521 B1 | 9/2002 | Wang |
| 6,469,484 B2 | 10/2002 | L'Hermite et al. |
| 6,495,964 B1 | 12/2002 | Muthu et al. |
| 6,509,913 B2 | 1/2003 | Martin, Jr. et al. |
| 6,531,854 B2 | 3/2003 | Hwang |
| 6,580,258 B2 | 6/2003 | Wilcox et al. |
| 6,583,550 B2 | 6/2003 | Iwasa et al. |
| 6,628,106 B1 | 9/2003 | Batarseh et al. |
| 6,636,003 B2 | 10/2003 | Rahm et al. |
| 6,646,848 B2 | 11/2003 | Yoshida et al. |
| 6,657,417 B1 | 12/2003 | Hwang |
| 6,688,753 B2 | 2/2004 | Calon et al. |
| 6,713,974 B2 | 3/2004 | Patchornik et al. |
| 6,724,174 B1 | 4/2004 | Esteves et al. |
| 6,727,832 B1 | 4/2004 | Melanson |
| 6,737,845 B2 | 5/2004 | Hwang |
| 6,741,123 B1 | 5/2004 | Melanson et al. |
| 6,753,661 B2 | 6/2004 | Muthu et al. |
| 6,756,772 B2 | 6/2004 | McGinnis |
| 6,768,655 B1 | 7/2004 | Yang et al. |
| 6,781,351 B2 | 8/2004 | Mednik et al. |
| 6,788,011 B2 | 9/2004 | Mueller et al. |
| 6,806,659 B1 | 10/2004 | Mueller et al. |
| 6,839,247 B1 | 1/2005 | Yang et al. |
| 6,842,353 B2 * | 1/2005 | Yamada et al. .................. 363/89 |
| 6,860,628 B2 | 3/2005 | Robertson et al. |
| 6,870,325 B2 | 3/2005 | Bushell et al. |
| 6,873,065 B2 | 3/2005 | Haigh et al. |
| 6,882,552 B2 | 4/2005 | Telefus et al. |
| 6,888,322 B2 | 5/2005 | Dowling et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shteynberg et al. |
| 6,956,750 B1 | 10/2005 | Eason et al. |
| 6,958,920 B2 | 10/2005 | Mednik et al. |
| 6,963,496 B2 | 11/2005 | Bimbaud |
| 6,967,448 B2 | 11/2005 | Morgan et al. |
| 6,967,851 B2 * | 11/2005 | Yang et al. ..................... 363/16 |
| 6,970,503 B1 | 11/2005 | Kalb |
| 6,975,079 B2 | 12/2005 | Lys et al. |
| 6,975,523 B2 | 12/2005 | Kim et al. |
| 6,980,446 B2 | 12/2005 | Simada et al. |
| 7,003,023 B2 | 2/2006 | Krone et al. |
| 7,034,611 B2 | 4/2006 | Oswal et al. |
| 7,050,509 B2 | 5/2006 | Krone et al. |
| 7,064,498 B2 | 6/2006 | Dowling et al. |
| 7,064,531 B1 | 6/2006 | Zinn |
| 7,072,191 B2 | 7/2006 | Nakao et al. |
| 7,075,329 B2 | 7/2006 | Chen et al. |
| 7,078,963 B1 | 7/2006 | Andersen et al. |
| 7,088,059 B2 | 8/2006 | McKinney et al. |
| 7,099,163 B1 * | 8/2006 | Ying .......................... 363/21.11 |
| 7,102,902 B1 | 9/2006 | Brown et al. |
| 7,106,603 B1 | 9/2006 | Lin et al. |
| 7,109,791 B1 | 9/2006 | Epperson et al. |
| 7,126,288 B2 | 10/2006 | Ribarich et al. |
| 7,135,824 B2 | 11/2006 | Lys et al. |
| 7,145,295 B1 | 12/2006 | Lee et al. |
| 7,158,633 B1 | 1/2007 | Hein |
| 7,161,816 B2 | 1/2007 | Shteynberg et al. |
| 7,180,250 B1 | 2/2007 | Gannon |
| 7,183,957 B1 | 2/2007 | Melanson |
| 7,184,937 B1 | 2/2007 | Su |
| 7,221,130 B2 | 5/2007 | Ribeiro et al. |

(56) References Cited

U.S. PATENT DOCUMENTS

| | | |
|---|---|---|
| 7,233,135 B2 | 6/2007 | Noma et al. |
| 7,246,919 B2 | 7/2007 | Porchia et al. |
| 7,255,457 B2 | 8/2007 | Ducharm et al. |
| 7,266,001 B1 | 9/2007 | Notohamiprodjo et al. |
| 7,276,861 B1 | 10/2007 | Shteynberg et al. |
| 7,288,902 B1 | 10/2007 | Melanson |
| 7,292,013 B1 | 11/2007 | Chen et al. |
| 7,310,244 B2 | 12/2007 | Yang et al. |
| 7,345,458 B2 | 3/2008 | Kanai et al. |
| 7,375,476 B2 | 5/2008 | Walter et al. |
| 7,388,764 B2 | 6/2008 | Huynh et al. |
| 7,394,210 B2 | 7/2008 | Ashdown |
| 7,511,437 B2 | 3/2009 | Lys et al. |
| 7,538,499 B2 | 5/2009 | Ashdown |
| 7,545,130 B2 | 6/2009 | Latham |
| 7,554,473 B2 | 6/2009 | Melanson |
| 7,569,996 B2 | 8/2009 | Holmes et al. |
| 7,583,136 B2 | 9/2009 | Pelly |
| 7,606,532 B2 | 10/2009 | Wuidart |
| 7,656,103 B2 | 2/2010 | Shteynberg et al. |
| 7,667,986 B2 | 2/2010 | Artusi et al. |
| 7,684,223 B2 | 3/2010 | Wei |
| 7,710,047 B2 | 5/2010 | Shteynberg et al. |
| 7,719,246 B2 | 5/2010 | Melanson |
| 7,719,248 B1 | 5/2010 | Melanson |
| 7,746,043 B2 | 6/2010 | Melanson |
| 7,746,671 B2 | 6/2010 | Radecker et al. |
| 7,750,738 B2 | 7/2010 | Bach |
| 7,756,896 B1 | 7/2010 | Feingold |
| 7,777,563 B2 | 8/2010 | Midya et al. |
| 7,804,256 B2 | 9/2010 | Melanson |
| 7,804,480 B2 | 9/2010 | Jeon et al. |
| 8,008,898 B2 | 8/2011 | Melanson et al. |
| 2002/0065583 A1 | 5/2002 | Okada |
| 2002/0145041 A1 | 10/2002 | Muthu et al. |
| 2002/0150151 A1 | 10/2002 | Krone et al. |
| 2002/0166073 A1 | 11/2002 | Nguyen et al. |
| 2003/0095013 A1 | 5/2003 | Melanson et al. |
| 2003/0174520 A1 | 9/2003 | Bimbaud |
| 2003/0223255 A1 | 12/2003 | Ben-Yaakov |
| 2004/0004465 A1 | 1/2004 | McGinnis |
| 2004/0046683 A1 | 3/2004 | Mitamura et al. |
| 2004/0085030 A1 | 5/2004 | Laflamme et al. |
| 2004/0085117 A1 | 5/2004 | Melbert et al. |
| 2004/0169477 A1 | 9/2004 | Yancie et al. |
| 2004/0227571 A1 | 11/2004 | Kuribayashi |
| 2004/0228116 A1 | 11/2004 | Miller et al. |
| 2004/0232971 A1 | 11/2004 | Kawasaki et al. |
| 2004/0239262 A1 | 12/2004 | Ido et al. |
| 2005/0057237 A1 | 3/2005 | Clavel |
| 2005/0156770 A1 | 7/2005 | Melanson |
| 2005/0168492 A1 | 8/2005 | Hekstra et al. |
| 2005/0184895 A1 | 8/2005 | Petersen et al. |
| 2005/0197952 A1 | 9/2005 | Shea et al. |
| 2005/0207190 A1 | 9/2005 | Gritter |
| 2005/0218838 A1 | 10/2005 | Lys |
| 2005/0222881 A1 | 10/2005 | Booker |
| 2005/0253533 A1 | 11/2005 | Lys et al. |
| 2005/0270813 A1 | 12/2005 | Zhang et al. |
| 2005/0275354 A1 | 12/2005 | Hausman, Jr. et al. |
| 2005/0275386 A1 | 12/2005 | Jepsen et al. |
| 2006/0002110 A1 | 1/2006 | Dowling |
| 2006/0022916 A1 | 2/2006 | Aiello |
| 2006/0023002 A1 | 2/2006 | Hara et al. |
| 2006/0116898 A1 | 6/2006 | Peterson |
| 2006/0125420 A1 | 6/2006 | Boone et al. |
| 2006/0184414 A1 | 8/2006 | Pappas et al. |
| 2006/0214603 A1 | 9/2006 | Oh et al. |
| 2006/0226795 A1 | 10/2006 | Walter et al. |
| 2006/0238136 A1 | 10/2006 | Johnson, III et al. |
| 2006/0261754 A1 | 11/2006 | Lee |
| 2006/0285365 A1 | 12/2006 | Huynh et al. |
| 2007/0024213 A1 | 2/2007 | Shteynberg et al. |
| 2007/0029946 A1 | 2/2007 | Yu et al. |
| 2007/0040512 A1 | 2/2007 | Jungwirth et al. |
| 2007/0053182 A1 | 3/2007 | Robertson |
| 2007/0055564 A1 | 3/2007 | Fourman |
| 2007/0103949 A1 | 5/2007 | Tsuruya |
| 2007/0124615 A1 | 5/2007 | Orr |
| 2007/0126656 A1 | 6/2007 | Huang et al. |
| 2007/0182699 A1 | 8/2007 | Ha et al. |
| 2007/0285031 A1 | 12/2007 | Shteynberg et al. |
| 2008/0012502 A1 | 1/2008 | Lys |
| 2008/0027841 A1 | 1/2008 | Eder |
| 2008/0043504 A1 | 2/2008 | Ye et al. |
| 2008/0054815 A1 | 3/2008 | Kotikalapoodi et al. |
| 2008/0116818 A1 | 5/2008 | Shteynberg et al. |
| 2008/0130322 A1 | 6/2008 | Artusi et al. |
| 2008/0130336 A1 | 6/2008 | Taguchi |
| 2008/0150433 A1 | 6/2008 | Tsuchida et al. |
| 2008/0154679 A1 | 6/2008 | Wade |
| 2008/0174291 A1 | 7/2008 | Hansson et al. |
| 2008/0174372 A1 | 7/2008 | Tucker et al. |
| 2008/0175029 A1 | 7/2008 | Jung et al. |
| 2008/0192509 A1 | 8/2008 | Dhuyvetter et al. |
| 2008/0224635 A1 | 9/2008 | Hayes |
| 2008/0232141 A1 | 9/2008 | Artusi et al. |
| 2008/0239764 A1 | 10/2008 | Jacques et al. |
| 2008/0259655 A1 | 10/2008 | Wei et al. |
| 2008/0278132 A1 | 11/2008 | Kesterson et al. |
| 2009/0067204 A1 | 3/2009 | Ye et al. |
| 2009/0070188 A1 | 3/2009 | Scott et al. |
| 2009/0147544 A1 | 6/2009 | Melanson |
| 2009/0174479 A1 | 7/2009 | Yan et al. |
| 2009/0218960 A1 | 9/2009 | Lyons et al. |
| 2010/0141317 A1 | 6/2010 | Szajnowski |
| 2010/0213859 A1 | 8/2010 | Shteynberg et al. |

FOREIGN PATENT DOCUMENTS

| | | |
|---|---|---|
| EP | 0585789 A | 3/1994 |
| EP | 0632679 | 1/1995 |
| EP | 0838791 | 4/1998 |
| EP | 0910168 A1 | 4/1999 |
| EP | 1014563 | 6/2000 |
| EP | 1164819 A | 12/2001 |
| EP | 1213823 A2 | 6/2002 |
| EP | 1460775 | 9/2004 |
| EP | 1289107 A2 | 3/2005 |
| EP | 1528785 A | 5/2005 |
| EP | 2204905 A1 | 7/2010 |
| GB | 2069269 A | 8/1981 |
| JP | WO 2006/022107 A2 | 3/2006 |
| WO | WO9725836 | 7/1997 |
| WO | 01/15316 A1 | 1/2001 |
| WO | 01/97384 A | 12/2001 |
| WO | 02/15386 A2 | 2/2002 |
| WO | WO0227944 | 4/2002 |
| WO | 02/091805 A2 | 11/2002 |
| WO | WO2006013557 | 2/2006 |
| WO | 2006/067521 A | 6/2006 |
| WO | WO2006135584 | 12/2006 |
| WO | 2007016373 A1 | 2/2007 |
| WO | 2007/026170 A | 3/2007 |
| WO | 2007/079362 A | 7/2007 |
| WO | WO2008072160 | 6/2008 |
| WO | WO20080152838 | 12/2008 |
| WO | 2010035155 A2 | 1/2010 |

OTHER PUBLICATIONS

Yu, Zhenyu, 3.3V DSP for Digital Motor Control, Texas Instruments, Application Report SPRA550 dated Jun. 1999.

International Rectifier, Data Sheet No. PD60143-O, Current Sensing Single Channel Driver, El Segundo, CA, dated Sep. 8, 2004.

Balogh, Laszlo, "Design and Application Guide for High Speed MOSFET Gate Drive Circuits" [Online] 2001, Texas Instruments, Inc., SEM-1400, Unitrode Power Supply Design Seminar, Topic II, TI literature No. SLUP133, XP002552367, Retrieved from the Internet: URL:htt://focus.ti.com/lit/ml/slup169/slup169.pdf the whole document.

"HV9931 Unity Power Factor LED Lamp Driver, Initial Release" 2005, Supertex Inc., Sunnyvale, CA USA.

(56) References Cited

OTHER PUBLICATIONS

"AN-H52 Application Note: HV9931 Unity Power Factor LED Lamp Driver" Mar. 7, 2007, Supertex Inc., Sunnyvale, CA, USA.
Dustin Rand et al: "Issues, Models and Solutions for Triac Modulated Phase Dimming of LED Lamps" Power Electronics Specialists Conference, 2007. PESC 2007, IEEE, IEEE, P1, Jun. 1, 2007, pp. 1398-1404.
Spiazzi G et al: "Analysis of a High-Power-Factor Electronic Ballast for High Brightness Light Emitting Diodes" Power Electronics Specialists, 2005 IEEE 36th Conference on June 12, 2005, Piscatawa, NJ USA, IEEE, Jun. 12, 2005, pp. 1494-1499.
International Search Report PCT/US2008/062381 dated Feb. 5, 2008.
International Search Report PCT/US2008/056739 dated Dec. 3, 2008.
Written Opinion of the International Searching Authority PCT/US2008/062381 dated Feb. 5, 2008.
Ben-Yaakov et al, "The Dynamics of a PWM Boost Converter with Resistive Input" IEEE Transactions on Industrial Electronics, IEEE Service Center, Piscataway, NJ, USA, vol. 46, No. 3, Jun. 1, 1999.
International Search Report PCT/US2008/062398 dated Feb. 5, 2008.
Partial International Search PCT/US2008/062387 dated Feb. 5, 2008.
Noon, Jim "UC3855A/B High Performance Power Factor Preregulator", Texas Instruments, SLUA146A, May 1996, Revised Apr. 2004.
"High Performance Power Factor Preregulator", Unitrode Products from Texas Instruments, SLUS382B, Jun. 1998, Revised Oct. 2005.
International Search Report PCT/GB2006/003259 dated Jan. 12, 2007.
Written Opinion of the International Searching Authority PCT/US2008/056739.
International Search Report PCT/US2008/056606 dated Dec. 3, 2008.
Written Opinion of the International Searching Authority PCT/US2008/056606 dated Dec. 3, 2008.
International Search Report PCT/US2008/056608 dated Dec. 3, 2008.
Written Opinion of the International Searching Authority PCT/US2008/056608 dated Dec. 3, 2008.
International Search Report PCT/GB2005/050228 dated Mar. 14, 2006.
International Search PCT/US2008/062387 dated Jan. 10, 2008.
Data Sheet LT3496 Triple Output LED Driver, 2007, Linear Technology Corporation, Milpitas, CA.
News Release, Triple Output LED, LT3496.
ST Datasheet L6562, Transition-Mode PFC Controller, 2005, STMicroelectronics, Geneva, Switzerland.
Maksimovic, Regan Zane and Robert Erickson, Impact of Digital Control in Power Electronics, Proceedings of 2004 International Symposium on Power Semiconductor Devices & Ics, Kitakyushu Apr. 5, 2010, Colorado Power Electronics Center, ECE Department, University of Colorado, Boulder, CO.
Freescale Semiconductor, Inc., Dimmable Light Ballast with Power Factor Correction, Design Reference Manual, DRM067, Rev. 1, Dec. 2005.
J. Zhou et al., Novel Sampling Algorithm for DSP Controlled 2 kW PFC Converter, IEEE Transactions on Power Electronics, vol. 16, No. 2, Mar. 2001.
A. Prodic, Compensator Design and Stability Assessment for Fast Voltage Loops of Power Factor Correction Rectifiers, IEEE Transactions on Power Electronics, vol. 22, No. 5, Sep. 2007.
M. Brkovic et al., "Automatic Current Shaper with Fast Output Regulation and Soft-Switching," S.15.C Power Converters, Telecommunications Energy Conference, 1993.
Dallas Semiconductor, Maxim, "Charge-Pump and Step-Up DC-DC Converter Solutions for Powering White LEDs in Series or Parallel Connections," Apr. 23, 2002.
Freescale Semiconductor, AN3052, Implementing PFC Average Current Mode Control Using the MC9S12E128, Nov. 2005.

D. Maksimovic et al., "Switching Converters with Wide DC Conversion Range," Institute of Electrical and Electronic Engineer's (IEEE) Transactions on Power Electronics, Jan. 1991.
V. Nguyen et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.
S. Zhou et al., "A High Efficiency, Soft Switching DC-DC Converter with Adaptive Current-Ripple Control for Portable Applications," IEEE Transactions on Circuits and Systems-II: Express Briefs, vol. 53, No. 4, Apr. 2006.
K. Leung et al., "Use of State Trajectory Prediction in Hysteresis Control for Achieving Fast Transient Response of the Buck Converter," Circuits and Systems, 2003. ISCAS apos;03. Proceedings of the 2003 International Symposium, vol. 3, Issue , May 25-28, 2003 pp. III-439-III-442 vol. 3.
K. Leung et al., "Dynamic Hysteresis Band Control of the Buck Converter with Fast Transient Response," IEEE Transactions on Circuits and Systems—II: Express Briefs, vol. 52, No. 7, Jul. 2005.
Y. Ohno, Spectral Design Considerations for White LED Color Rendering, Final Manuscript, Optical Engineering, vol. 44, 111302 (2005).
S. Skogstad et al., A Proposed Stability Characterization and Verification Method for High-Order Single-Bit Delta-Sigma Modulators, Norchip Conference, Nov. 2006 http://folk.uio.no/savskogs/pub/A_Proposed_Stability_Characterization.pdf.
J. Turchi, Four Key Steps to Design a Continuous Conduction Mode PFC Stage Using the NCP1653, on Semiconductor, Publication Order No. AND184/D, Nov. 2004.
Megaman, D or S Dimming ESL, Product News, Mar. 15, 2007.
J. Qian et al., New Charge Pump Power-Factor-Correction Electronic Ballast with a Wide Range of Line Input Voltage, IEEE Transactions on Power Electronics, vol. 14, No. 1, Jan. 1999.
P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.
J. Qian et al., Charge Pump Power-Factor-Correction Technologies Part II: Ballast Applications, IEEE Transactions on Power Electronics, vol. 15, No. 1, Jan. 2000.
Chromacity Shifts in High-Power White LED Systems due to Different Dimming Methods, Solid-State Lighting, http://www.lrc.rpi.edu/programs/solidstate/completedProjects.asp?ID=76, printed May 3, 2007.
S. Chan et al., Design and Implementation of Dimmable Electronic Ballast Based on Integrated Inductor, IEEE Transactions on Power Electronics, vol. 22, No. 1, Jan. 2007.
M. Madigan et al., Integrated High-Quality Rectifier-Regulators, IEEE Transactions on Industrial Electronics, vol. 46, No. 4, Aug. 1999.
T. Wu et al., Single-Stage Electronic Ballast with Dimming Feature and Unity Power Factor, IEEE Transactions on Power Electronics, vol. 13, No. 3, May 1998.
F. Tao et al., "Single-Stage Power-Factor-Correction Electronic Ballast with a Wide Continuous Dimming Control for Fluorescent Lamps," IEEE Power Electronics Specialists Conference, vol. 2, 2001.
Azoteq, IQS17 Family, IQ Switch®—ProxSense™ Series, Touch Sensor, Load Control and User Interface, IQS17 Datasheet V2.00.doc, Jan. 2007.
C. Dilouie, Introducing the LED Driver, EC&M, Sep. 2004.
S. Lee et al., TRIAC Dimmable Ballast with Power Equalization, IEEE Transactions on Power Electronics, vol. 20, No. 6, Nov. 2005.
L. Gonthier et al., EN55015 Compliant 500W Dimmer with Low-Losses Symmetrical Switches, 2005 European Conference on Power Electronics and Applications, Sep. 2005.
Why Different Dimming Ranges? The Difference Between Measured and Perceived Light, http://www.lutron.com/ballast/pdf/LutronBallastpg3.pdf.
D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.

(56) References Cited

OTHER PUBLICATIONS

Light Dimmer Circuits, www.epanorama.net/documents/lights/lightdimmer.html, printed Mar. 26, 2007.
Light Emitting Diode, http://en.wikipedia.org/wiki/Light-emitting_diode, printed Mar. 27, 2007.
Color Temperature, www.sizes.com/units/color_temperature.htm, printed Mar. 27, 2007.
S. Lee et al., A Novel Electrode Power Profiler for Dimmable Ballasts Using DC Link Voltage and Switching Frequency Controls, IEEE Transactions on Power Electronics, vol. 19, No. 3, May 2004.
Y. Ji et al., Compatibility Testing of Fluorescent Lamp and Ballast Systems, IEEE Transactions on Industry Applications, vol. 35, No. 6, Nov./Dec. 1999.
National Lighting Product Information Program, Specifier Reports, "Dimming Electronic Ballasts," vol. 7, No. 3, Oct. 1999.
Supertex Inc., Buck-based LED Drivers Using the HV9910B, Application Note AN-H48, Dec. 28, 2007.
D. Rand et al., Issues, Models and Solutions for Triac Modulated Phase Dimming of LED Lamps, Power Electronics Specialists Conference, 2007.
Supertex Inc., HV9931 Unity Power Factor LED Lamp Driver, Application Note AN-H52, Mar. 7, 2007.
Supertex Inc., 56W Off-line LED Driver, 120VAC with PFC, 160V, 350mA Load, Dimmer Switch Compatible, DN-H05, Feb. 2007.
ST Microelectronics, Power Factor Corrector L6561, Jun. 2004.
Fairchild Semiconductor, Application Note 42047 Power Factor Correction (PFC) Basics, Rev. 0.9.0 Aug. 19, 2004.
M. Radecker et al., Application of Single-Transistor Smart-Power IC for Fluorescent Lamp Ballast, Thirty-Fourth Annual Industry Applications Conference IEEE, vol. 1, Oct. 3-7, 1999.
M. Rico-Secades et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.
Fairchild Semiconductor, FAN4800, Low Start-up Current PFC/PWM Controller Combos, Nov. 2006.
Fairchild Semiconductor, FAN4810, Power Factor Correction Controller, Sep. 24, 2003.
Fairchild Semiconductor, FAN4822, ZVS Average Current PFC Controller, Aug. 10, 2001.
Fairchild Semiconductor, FAN7527B, Power Factor Correction Controller, 2003.
Fairchild Semiconductor, ML4821, Power Factor Controller, Jun. 19, 2001.
Freescale Semiconductor, AN1965, Design of Indirect Power Factor Correction Using 56F800/E, Jul. 2005.
International Search Report for PCT/US2008/051072, mailed Jun. 4, 2008.
Infineon, CCM-PFC Standalone Power Factor Correction (PFC) Controller in Continuous Conduction Mode (CCM), Version 2.1, Feb. 6, 2007.
International Rectifier, IRAC1150-300W Demo Board, User's Guide, Rev 3.0, Aug. 2, 2005.
International Rectifier, Application Note AN-1077,PFC Converter Design with IR1150 One Cycle Control IC, rev. 2.3, Jun. 2005.
International Rectifier, Data Sheet PD60230 revC, Feb. 5, 2007.
Lu et al, International Rectifier, Bridgeless PFC Implementation Using One Cycle Control Technique, 2005.
Linear Technology, LT1248, Power Factor Controller, Apr. 20, 2007.
ON Semiconductor, AND8123/D, Power Factor Correction Stages Operating in Critical Conduction Mode, Sep. 2003.
ON Semiconductor, MC33260, GreenLine Compact Power Factor Controller: Innovative Circuit for Cost Effective Solutions, Sep. 2005.
ON Semiconductor, NCP1605, Enhanced, High Voltage and Efficient Standby Mode, Power Factor Controller, Feb. 2007.
ON Semconductor, NCP1606, Cost Effective Power Factor Controller, Mar. 2007.
ON Semiconductor, NCP1654, Product Review, Power Factor Controller for Compact and Robust, Continuous Conduction Mode Pre-Converters, Mar. 2007.
Philips, Application Note, 90W Resonant SMPS with TEA1610 SwingChip, AN99011, 1999.
NXP, TEA1750, GreenChip III SMPS control IC Product Data Sheet, Apr. 6, 2007.
Renesas, HA16174P/FP, Power Factor Correction Controller IC, Jan. 6, 2006.
Renesas Technology Releases Industry's First Critical-Conduction-Mode Power Factor Correction Control IC Implementing Interleaved Operation, Dec. 18, 2006.
Renesas, Application Note R2A20111 EVB, PFC Control IC R2A20111 Evaluation Board, Feb. 2007.
STMicroelectronics, L6563, Advanced Transition-Mode PFC Controller, Mar. 2007.
Texas Instruments, Application Note SLUA321, Startup Current Transient of the Leading Edge Triggered PFC Controllers, Jul. 2004.
Texas Instruments, Application Report, SLUA309A, Avoiding Audible Noise at Light Loads when using Leading Edge Triggered PFC Converters, Sep. 2004.
Texas Instruments, Application Report SLUA369B, 350-W, Two-Phase Interleaved PFC Pre-Regulator Design Review, Mar. 2007.
Unitrode, High Power-Factor Preregulator, Oct. 1994.
Texas Instruments, Transition Mode PFC Controller, SLUS515D, Jul. 2005.
Unitrode Products From Texas Instruments, Programmable Output Power Factor Preregulator, Dec. 2004.
Unitrode Products From Texas Instruments, High Performance Power Factor Preregulator, Oct. 2005.
Texas Instruments, UCC3817 BiCMOS Power Factor Preregulator Evaluation Board User's Guide, Nov. 2002.
Unitrode, L. Balogh, Design Note UC3854A/B and UC3855A/B Provide Power Limiting with Sinusoidal Input Current for PFC Front Ends, SLUA196A, Nov. 2001.
A. Silva De Morais et al., A High Power Factor Ballast Using a Single Switch with Both Power Stages Integrated, IEEE Transactions on Power Electronics, vol. 21, No. 2, Mar. 2006.
M. Ponce et al., High-Efficient Integrated Electronic Ballast for Compact Fluorescent Lamps, IEEE Transactions on Power Electronics, vol. 21, No. 2, Mar. 2006.
A. R. Seidel et al., A Practical Comparison Among High-Power-Factor Electronic Ballasts with Similar Ideas, IEEE Transactions on Industry Applications, vol. 41, No. 6, Nov.-Dec. 2005.
F. T. Wakabayashi et al., An Improved Design Procedure for LCC Resonant Filter of Dimmable Electronic Ballasts for Fluorescent Lamps, Based on Lamp Model, IEEE Transactions on Power Electronics, vol. 20, No. 2, Sep. 2005.
J. A. Vilela Jr. et al., An Electronic Ballast with High Power Factor and Low Voltage Stress, IEEE Transactions on Industry Applications, vol. 41, No. 4, Jul./Aug. 2005.
S. T.S. Lee et al., Use of Saturable Inductor to Improve the Dimming Characteristics of Frequency-Controlled Dimmable Electronic Ballasts, IEEE Transactions on Power Electronics, vol. 19, No. 6, Nov. 2004.
M. K. Kazimierczuk et al., Electronic Ballast for Fluorescent Lamps, IEEE Transactions on Power Electronics, vol. 8, No. 4, Oct. 1993.
S. Ben-Yaakov et al., Statics and Dynamics of Fluorescent Lamps Operating at High Frequency: Modeling and Simulation, IEEE Transactions on Industry Applications, vol. 38, No. 6, Nov.-Dec. 2002.
H. L. Cheng et al., A Novel Single-Stage High-Power-Factor Electronic Ballast with Symmetrical Topology, IEEE Transactions on Power Electronics, vol. 50, No. 4, Aug. 2003.
J.W.F. Dorleijn et al., Standardisation of the Static Resistances of Fluorescent Lamp Cathodes and New Data for Preheating, Industry Applications Conference, vol. 1, Oct. 13-18, 2002.
Q. Li et al., An Analysis of the ZVS Two-Inductor Boost Converter under Variable Frequency Operation, IEEE Transactions on Power Electronics, vol. 22, No. 1, Jan. 2007.
H. Peng et al., Modeling of Quantization Effects in Digitally Controlled DC-DC Converters, IEEE Transactions on Power Electronics, vol. 22, No. 1, Jan. 2007.

(56) References Cited

OTHER PUBLICATIONS

G. Yao et al., Soft Switching Circuit for Interleaved Boost Converters, IEEE Transactions on Power Electronics, vol. 22, No. 1, Jan. 2007.
C. M. De Oliviera Stein et al., A ZCT Auxiliary Communication Circuit for Interleaved Boost Converters Operating in Critical Conduction Mode, IEEE Transactions on Power Electronics, vol. 17, No. 6, Nov. 2002.
W. Zhang et al., A New Duty Cycle Control Strategy for Power Factor Correction and FPGA Implementation, IEEE Transactions on Power Electronics, vol. 21, No. 6, Nov. 2006.
H. Wu et al., Single Phase Three-Level Power Factor Correction Circuit with Passive Lossless Snubber, IEEE Transactions on Power Electronics, vol. 17, No. 2, Mar. 2006.
O. Garcia et al., High Efficiency PFC Converter to Meet EN61000-3-2 AND A14, Proceedings of the 2002 IEEE International Symposium on Industrial Electronics, vol. 3, 2002.
P. Lee et al., Steady-State Analysis of an Interleaved Boost Converter with Coupled Inductors, IEEE Transactions on Industrial Electronics, vol. 47, No. 4, Aug. 2000.
D.K.W. Cheng et al., A New Improved Boost Converter with Ripple Free Input Current Using Coupled Inductors, Power Electronics and Variable Speed Drives, Sep. 21-23, 1998.
B.A. Miwa et al., High Efficiency Power Factor Correction Using Interleaved Techniques, Applied Power Electronics Conference and Exposition, Seventh Annual Conference Proceedings, Feb. 23-27, 1992.
Z. Lai et al., A Family of Power-Factor-Correction Controllers, Twelfth Annual Applied Power Electronics Conference and Exposition, vol. 1, Feb. 23-27, 1997.
L. Balogh et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7-11, 1993.
Fairchild Semiconductor, Application Note 42030, Theory and Application of the ML4821 Average Current Mode PFC Controller, Oct. 25, 2000.
Unitrode Products From Texas Instruments, BiCMOS Power Factor Preregulator, Feb. 2006.
D. Hausman, Lutron, RTISS-TE Operation, Real-Time Illumination Stability Systems for Trailing-Edge (Reverse Phase Control) Dimmers, v. 1.0 Dec. 2004.
International Rectifier, Data Sheet No. PD60230 revC, IR1150(S)(PbF), uPFC One Cycle Control PFC IC Feb. 5, 2007.
Texas Instruments, Application Report SLUA308, UCC3817 Current Sense Transformer Evaluation, Feb. 2004.
Texas Instruments, Application Report SPRA902A, Average Current Mode Controlled Power Factor Correctiom Converter using TMS320LF2407A, Jul. 2005.
Unitrode, Design Note DN-39E, Optimizing Performance in UC3854 Power Factor Correction Applications, Nov. 1994.
Fairchild Semiconductor, Application Note 42030, Theory and Application of the ML4821 Average Currrent Mode PFC Controller, Aug. 1997.
Fairchild Semiconductor, Application Note AN4121, Design of Power Factor Correction Circuit Using FAN7527B, Rev.1.0.1, May 30, 2002.
Fairchild Semiconductor, Application Note 6004, 500W Power-Factor-Corrected (PFC) Converter Design with FAN4810, Rev. 1.0.1, Oct. 31, 2003.
Fairchild Semiconductor, FAN4822, ZVA Average Current PFC Controller, Rev. 1.0.1 Aug. 10. 2001.
Fairchild Semiconductor, ML4821, Power Factor Controller, Rev. 1.0.2, Jun. 19, 2001.
Fairchild Semiconductor, ML4812, Power Factor Controller, Rev. 1.0.4, May 31, 2001.
Linear Technology, 100 Watt LED Driver, undated.
Fairchild Semiconductor, FAN7544, Simple Ballast Controller, Rev. 1.0.0.
Fairchild Semiconductor, FAN7532, Ballast Controller, Rev. 1.0.2.
Fairchild Semiconductor, FAN7711, Ballast Control IC, Rev. 1.0.2.
Fairchild Semiconductor, KA7541, Simple Ballast Controller, Rev. 1.0.3.
ST Microelectronics, L6574, CFL/TL Ballast Driver Preheat and Dimming, Sep. 2003.
ST Microelectronics, AN993, Application Note, Electronic Ballast with PFC Using L6574 and L6561, May 2004.
International Search Report and Written Opinion for PCT/US2008/062384 dated Jan. 14, 2008.
S. Dunlap et al., Design of Delta-Sigma Modulated Switching Power Supply, Circuits & Systems, Proceedings of the 1998 IEEE International Symposium, 1998.
Texas Instruments, Interleaving Continuous Conduction Mode PFC Controller, UCC28070, SLUS794C, Nov. 2007, revised Jun. 2009, Texas Instruments, Dallas TX.
Prodic, A. et al, "Dead Zone Digital Controller for Improved Dynamic Response of Power Factor Preregulators," IEEE, 2003.
Texas Instruments, SLOS318F, "High-Speed, Low Noise, Fully-Differential I/O Amplifiers," THS4130 and THS4131, US, Jan. 2006.
International Search Report and Written Opinion, PCT US20080062387, dated Feb. 5, 2008.
International Search Report and Written Report PCT US20080062428 dated Feb. 5, 2008.
Hirota, Atsushi et al, "Analysis of Single Switch Delta-Sigma Modulated Pulse Space Modulation PFC Converter Effectively Using Switching Power Device," IEEE, US, 2002.
Prodic, Aleksandar, "Digital Controller for High-Frequency Rectifiers with Power Factor Correction Suitable for On-Chip Implementation," IEEE, US, 2007.
International Search Report and Written Opinion, PCT US20080062378, dated Feb. 5, 2008.
International Search Report and Written Opinion, PCT US20090032351, dated Jan. 29, 2009.
Erickson, Robert W. et al, "Fundamentals of Power Electronics," Second Edition, Chapter 6, Boulder, CO, 2001.
Allegro Microsystems, A1442, "Low Voltage Full Bridge Brushless DC Motor Driver with Hall Commutation and Soft-Switching, and Reverse Battery, Short Circuit, and Thermal Shutdown Protection," Worcester MA, 2009.
Texas Instruments, SLUS828B, "8-Pin Continuous Conduction Mode (CCM) PFC Controller", UCC28019A, US, revised Apr. 2009.
Analog Devices, "120 kHz Bandwidth, Low Distortion, Isolation Amplifier", AD215, Norwood, MA, 1996.
Burr-Brown, ISO120 and ISO121, "Precision Los Cost Isolation Amplifier," Tucson AZ, Mar. 1992.
Burr-Brown, ISO130, "High IMR, Low Cost Isolation Amplifier," SBOS220, US, Oct. 2001.
Mamano, Bob, "Current Sensing Solutions for Power Supply Designers", Unitrode Seminar Notes SEM1200, 1999.
http://toolbarpdf.com/docs/functions-and-features-of-inverters.html printed on Jan. 20. 2011.
"HV9931 Unity Power Factor LED Lamp Driver, Initial Release", Supertex Inc., Sunnyvale, CA USA 2005.
Dustin Rand et al: "Issues, Models and Solutions for Triac Modulated Phase Dimming of LED Lamps" Power Electronics Specialists Conference, 2007. PESC 2007. IEEE, IEEE, P1, Jun. 1, 2007, pp. 1398-1404.
Spiazzi G et al: "Analysis of a High-Power Factor Electronic Ballast for High Brightness Light Emitting Diodes" Power Electronics Specialists, 2005 IEEE 36th Conference on Jun. 12, 2005, Piscatawa, NJ, USA, IEEE, Jun. 12, 2005, pp. 1494-1499.
Partial International Search Report PCT/US2008/062387 dated Feb. 5, 2008.
Written Opinion of the International Searching Authority PCT/US2008/056739 dated Dec. 3, 2008.
International Search Report PCT/US2008/062387 dated Jan. 10, 2008.
Data Sheet LT3496 Triple Output LED Driver, Linear Technology Corporation, Milpitas, CA 2007.
Linear Technology, News Release, Triple Output LED, LT3496, Linear Technology, Milpitas, CA, May 24, 2007.
Abstract of CN1292598A in English, 2 pages.

(56) References Cited

OTHER PUBLICATIONS

English translation of the Search Report issued on Sep. 11, 2012 in the corresponding Chinese Patent Application No. 200980101628.8, 7 pages.
English translation of the first Office Action issued on Sep. 24, 2012 in the corresponding Chinese Patent Application No. 200980101628.8, 2 pages.
Response to first Office Action, as filed on Sep. 24, 2012 in the corresponding Chinese Patent Application No. 200980101628.8 (in Chinese), 13 pages.
Amanci, Adrian et al, Synchronization System with Zero-Crossing Peak Detection Algorithm for Power System Applications, 2010 Internatinal Power Electronics Conference, pp. 2984-1991, 2010.
Power Integrations, TOP200-4/14 TOPSwitch Family Three-Terminal Off-Line PWM Switch, Product Datasheet, Power Integrations, Inc., Jul. 1996, XP002524650, San Jose, CA, USA url: http://www.datasheet4u.com/download.ph p?id=311789, pp. 1-17.
PCT International Preliminary Report on Patentability dated Aug. 3, 2010, issued in corresponding PCT Patent Application No. PCT/US2009/032358, pp. 1-20.
UK Exam Report dated Feb. 2, 2012 issued in corresponding UK Patent Application No. GB1009005.8. p. 1.
Response to UK Exam Report dated Feb. 2, 2012, as filed in the corresponding UK Patent Application No. GB1009005.8 on Jun. 6, 2012, pp. 1-22.
Notification of Grant issued by the UK Intellectual Property Office dated Jul. 17, 2012, along with issued U.K. Patent No. UK2468239 dated Aug. 12, 2012, 41 pgs.

* cited by examiner

US 8,576,589 B2

SWITCH STATE CONTROLLER WITH A SENSE CURRENT GENERATED OPERATING VOLTAGE

CROSS REFERENCE TO RELATED APPLICATIONS

This application claims the benefit under 35 U.S.C. §119 (e) and 37 C.F.R. §1.78 of U.S. Provisional Application No. 61/024,587, filed Jan. 30, 2008 and entitled "Power Factor Correction with Boost Function Active in Standby Mode." U.S. Provisional Application No. 61/024,587 includes exemplary systems and methods and is incorporated by reference in its entirety.

BACKGROUND OF THE INVENTION

1. Field of the Invention

The present invention relates in general to the field of signal processing, and, more specifically, to a power control system that includes a switch state controller for a switching power converter that operates in at least some circumstances from an operating voltage derived from one or more sense currents. Each sense current is resistively derived from a voltage of the switching power converter.

2. Description of the Related Art

Power control systems often utilize a switching power converter to convert alternating current (AC) voltages to direct current (DC) voltages or DC-to-DC. Switching power converters often include a nonlinear energy transfer process to provide power factor corrected energy to a load. Power control systems provide power factor corrected and regulated output voltages to many devices that utilize a regulated output voltage.

FIG. 1 represents a power control system 100, which includes a switching power converter 102. Voltage source 101 supplies an alternating current (AC) input voltage $V_{in}(t)$ to a full bridge diode rectifier 103. The voltage source 101 is, for example, a public utility, and the AC voltage $V_{in}(t)$ is, for example, a 60 Hz/110 V line voltage in the United States of America or a 50 Hz/220 V line voltage in Europe. The rectifier 103 rectifies the input voltage $V_{in}(t)$ and supplies a rectified, time-varying, line input voltage $V_X(t)$ to the switching power converter.

The switching power converter 102 includes power factor correction (PFC) stage 124 and driver stage 126. The switching power converter 102 includes at least two switching operations, i.e. switching switch 108 to provide power factor correction and switching switch 108 to provide regulation of output voltage $V_O(t)$. The PFC stage 124 is controlled by switch 108 and provides power factor correction. The driver stage 126 is also controlled by switch 108 and regulates the transfer of energy from the line input voltage $V_X(t)$ through inductor 110 to capacitor 106. The inductor current $i_L$ ramps 'up' when the switch 108 conducts, i.e. is "ON". The inductor current $i_L$ ramps down when switch 108 is nonconductive, i.e. is "OFF", and supplies current $i_L$ to recharge capacitor 106. The time period during which inductor current $i_L$ ramps down is commonly referred to as the "inductor flyback time". Diode 111 prevents reverse current flow into inductor 110. In at least one embodiment, the switching power converter 102 operates in discontinuous current mode, i.e. ramp up time of the inductor current $i_L$ plus the inductor flyback time is less than the period of the control signal $CS_0$, which controls the conductivity of switch 108.

Input current $i_L$ is proportionate to the 'on-time' of switch 108, and the energy transferred to inductor 110 is proportionate to the 'on-time' squared. Thus, the energy transfer process is one embodiment of a nonlinear process. In at least one embodiment, control signal $CS_0$ is a pulse width modulated signal, and the switch 108 is a field effect transistor (FET), such as an n-channel FET. Control signal $CS_0$ is a gate voltage of switch 108, and switch 108 conducts when the pulse width of $CS_0$ is high. Thus, the 'on-time' of switch 108 is determined by the pulse width of control signal $CS_0$. Accordingly, the energy transferred to inductor 110 is proportionate to a square of the pulse width of control signal $CS_0$.

Capacitor 106 supplies stored energy to load 112. The capacitor 106 is sufficiently large so as to maintain a substantially constant output voltage $V_C(t)$, as established by a switch state controller 114 (as discussed in more detail below). The output voltage $V_C(t)$ remains substantially constant during constant load conditions. However, as load conditions change, the output voltage $V_C(t)$ changes. The switch state controller 114 responds to the changes in $V_C(t)$ and adjusts the control signal $CS_0$ to restore a substantially constant output voltage as quickly as possible. The switch state controller 114 includes a small capacitor 115 to filter any high frequency signals from the line input voltage $V_X(t)$.

The switch state controller 114 of power control system 100 controls switch 108 and, thus, controls power factor correction and regulates output power of the switching power converter 102. The goal of power factor correction technology is to make the switching power converter 102 appear resistive to the voltage source 101. Thus, the switch state controller 114 attempts to control the inductor current $i_L$ so that the average inductor current $i_L$ is linearly and directly related to the line input voltage $V_X(t)$. Prodić, *Compensator Design and Stability Assessment for Fast Voltage Loops of Power Factor Correction Rectifiers*, IEEE Transactions on Power Electronics, Vol. 22, No. 5, September 2007, pp. 1719-1729 (referred to herein as "Prodić"), describes an example of switch state controller 114. The switch state controller 114 supplies the pulse width modulated (PWM) control signal $CS_0$ to control the conductivity of switch 108. The values of the pulse width and duty cycle of control signal $CS_o$ depend on sensing two signals, namely, the line input voltage $V_X(t)$ and the capacitor voltage/output voltage $V_C(t)$.

Switch state controller 114 receives the two voltage signals, the line input voltage $V_X(t)$ and the output voltage $V_C(t)$, via a wide bandwidth current loop 116 and a slower voltage loop 118. The line input voltage $V_X(t)$ is sensed from node 120 between the diode rectifier 103 and inductor 110. The output voltage $V_C(t)$ is sensed from node 122 between diode 111 and load 112. The current loop 116 operates at a frequency $f_c$ that is sufficient to allow the switch state controller 114 to respond to changes in the line input voltage $V_X(t)$ and cause the inductor current $i_L$ to track the line input voltage to provide power factor correction. The current loop frequency is generally set to a value between 20 kHz and 130 kHz. The voltage loop 118 operates at a much slower frequency $f_v$, typically 10-20 Hz. By operating at 10-20 Hz, the voltage loop 118 functions as a low pass filter to filter an alternating current (AC) ripple component of the output voltage $V_C(t)$.

The switch state controller 114 controls the pulse width (PW) and period (TT) of control signal $CS_0$. Thus, switch state controller 114 controls the nonlinear process of switching power converter 102 so that a desired amount of energy is transferred to capacitor 106. The desired amount of energy depends upon the voltage and current requirements of load 112. To regulate the amount of energy transferred and maintain a power factor close to one, switch state controller 114 varies the period of control signal $CS_0$ so that the input current $i_L$ tracks the changes in input voltage $V_X(t)$ and holds the output voltage $V_C(t)$ constant. Thus, as the input voltage $V_x(t)$ increases, switch state controller 114 increases the period TT of control signal $CS_0$, and as the input voltage $V_x(t)$ decreases, switch state controller 114 decreases the period of control signal $CS_0$. At the same time, the pulse width PW of control signal $CS_0$ is adjusted to maintain a constant duty cycle (D) of control signal $CS_0$, and, thus, hold the output voltage $V_C(t)$ constant. In at least one embodiment, the switch state controller 114 updates the control signal $CS_0$ at a frequency much greater than the frequency of input voltage $V_x(t)$. The frequency of input voltage $V_x(t)$ is generally 50-60 Hz. The frequency 1/TT of control signal $CS_0$ is, for example, between 20 kHz and 130 kHz. Frequencies at or above 20 kHz avoid audio frequencies and frequencies at or below 130 kHz avoid significant switching inefficiencies while still maintaining good power factor, e.g. between 0.9 and 1, and an approximately constant output voltage $V_C(t)$. Power control system also includes auxiliary power supply 128. Auxiliary power supply 128 is the primary power source for providing operating power to PFC and output voltage controller 114. However, as subsequently discussed in more detail with reference to FIG. 3B, during certain power loss conditions, the auxiliary power supply 128 is unable to provide sufficient operating power to PFC and output voltage controller 114.

FIG. 2 depicts power control system 100 using voltage sensing. The power control system 100 includes series coupled resistors 202 to sense the input voltage $V_x(t)$ and generate an input sense voltage Vsx. The series coupled resistors 202 form a voltage divider, and the input sense voltage Vsx is sensed across the last resistor 204. The voltage divider uses multiple resistors because input voltage $V_x(t)$ is generally higher than the voltage rating of individual resistors. Using a series of resistors allows the voltage across each resistor to remain within the voltage rating of the resistors. Using 300 kohm resistors as the first three resistors and a 9 kohm last resistor 204, the input sense voltage is $0.01 \cdot V_x(t)$. The output voltage $V_{out}(t)$ is sensed in the same manner using series coupled resistors 206 as a voltage divider to generate an output sense voltage Vso.

FIG. 3A depicts the switch state controller 114 with two analog-to-digital converters (ADCs) 302 and 304. ADCs 302 and 304 convert respective sense voltages Vsx and Vso to respective digital output voltages $V_x(n)$ and $V_O(n)$ using a reference voltage $V_{REF}$. The reference voltage can be a bandgap developed voltage reference.

FIG. 3B depicts a power supply system 350. The power supply system 350 includes switching power converter 102 to provide power factor correction and to provide output voltage $V_O(t)$. (Output voltage $V_O(t)$ is the same as output voltage $V_c(t)$ in FIG. 1.) In at least one embodiment, the power supply system 350 provides power to a load 353 that can enter a very low power state (such as a standby-mode) or completely 'off' state. Examples of load 353 are computer systems or other data processing systems. During normal operation, switching power converter 102 is 'on' and performs a boost converter function to boost the input voltage $V_x(t)$ from, e.g. 130V, to generate output voltage $V_O(t)$, such as +400V. The output voltage $V_O(t)$ is provided to the main power supply 354 and to the standby power supply 352. "Normal" operation is when the power supply 350 is not in a low-power or 'off' state. The main power supply 354 provides a variety of voltages, such as +3V, +5V, and +12V, to power various components of load 353 during normal operation. The auxiliary power supply 128 provides primary power to switch state controller 114. The switch state controller 114 includes an input to receive the power from auxiliary power supply 128. However, during certain power loss conditions, auxiliary power supply 128 provides insufficient operating power to switch state controller 114. During such power loss conditions, switch state controller 114 becomes inoperative. The power loss conditions include a standby-mode when auxiliary power supply 128 is intentionally shut-down to save power. Power loss conditions also occur when switching power converter 102 is inoperative. In at least one embodiment, auxiliary power supply 128 receives power from switching power converter 102. Thus, when switching power converter 102 is inoperative, such as during a missed cycle of input voltage $V_x(t)$, auxiliary power supply 128 provides insufficient operating power to switch state controller 114.

Voltage regulators and other components (not shown) can be connected between auxiliary power supply 128 and switch state controller 114. The standby power supply 352 supplies, for example, up to 5 W of power to load 353. The main power supply 354 supplies, for example, up to 500 W of power. The particular amount of power supplied by the standby power supply 352 and the main power supply 354 are a matter of design choice.

Each of the components 102, 114, 352, 354, and 128 include an underlined state, i.e. ON or OFF, that represents the state of the components 102, 114, 352, 354, and 128 in standby mode. In standby-mode, only the standby power supply 352 is ON. In standby-mode, the standby power supply 352 provides an auxiliary output voltage $V_A$ that provides power to circuits (not shown) that operate during low power states, such as standby-mode monitoring circuits. The standby power supply 352 also provides power to components of load 353 that are used to initialize other components of load 353 as the components enter normal operation.

Because switching power converter 102 is 'off' during standby-mode, the output voltage $V_O(t)$ drops to the input voltage $V_x(t)$. Thus, the standby power supply 352 must be designed to provide output power from voltages ranging from $V_x(t)$ to $V_O(t)$, such as +130V to +400V. The resulting standby power supply 352 is, thus, generally less efficient than a power supply designed to operate with an approximately constant input voltage. Thus, there is a need for a switching power converter that can provide an approximately constant input voltage when operating.

SUMMARY OF THE INVENTION

In one embodiment of the present invention, an apparatus includes a controller. The controller is configured to operate during at least one controller operational mode from an operating voltage generated from at least a first portion of the first sense current, wherein the first sense current is resistively derived from a first voltage sense of a switching power converter. The controller is also configured to receive at least a second portion of the first sense current and use the second portion of the first sense current to control a switching operation of the switching power converter.

In another embodiment of the present invention, a method includes operating the controller during at least one controller operational mode from an operating voltage generated from at least a first portion of the first sense current, wherein the first sense current is resistively derived from a first voltage sense of a switching power converter. The method also includes receiving in a controller at least a second portion of the first sense current and using the second portion of the first sense current to control a switching operation of the switching power converter.

In a further embodiment of the present invention, an apparatus includes means for operating the controller during at least one controller operational mode from an operating voltage generated from at least a first portion of the first sense current, wherein the first sense current is resistively derived from a first voltage sense of a switching power converter. The apparatus also includes means for receiving in a controller at least a second portion of the first sense current and means for using the second portion of the first sense current to control a switching operation of the switching power converter.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A power supply system and method include a switch state controller that is operational to control a switching power converter during certain power loss conditions that cause conventional switch state controllers to have diminished or no functionality. In at least one embodiment, during certain power loss conditions, such as when an auxiliary power supply is in standby mode or when the switching power converter is not operating, the auxiliary power supply for the switch state controller does not provide sufficient operating power to the switch state controller during certain power loss conditions. In at least one embodiment, during such power loss conditions, power is generated for the switch state controller using sense input and/or sense output currents of the switching power converter to allow a switch state controller to generate a control signal to control a switch of the switching power converter. In at least one embodiment, the switch state controller is fabricated as an integrated circuit (IC).

Thus, during converter power supply power loss conditions, the switch state controller remains operational to cause the switching power converter to supply an approximately constant output voltage to, for example, a standby power supply that provides power to a load. By supplying the standby power supply with an approximately constant output voltage during standby and normal operational modes, the standby power supply can be designed to operate more efficiently than a standby power supply designed to operate with a wide range of input voltages. In at least one embodiment, the power supplied to the switch state controller by the sense current(s) is proportional to the output voltage of the switching power converter. As the output power of the switching power converter increases, the increased power demand for the switch state controller is provided by the auxiliary power supply.

Thus, in at least one embodiment, the sense current(s) can be used to provide power to the switch state controller. In at least one embodiment, the sense current(s) can provide power to the switch state controller during certain power loss conditions when auxiliary IC power is unavailable or diminished, such as during start-up of the switch state controller or during input voltage missed cycles. In at least one embodiment, the IC draws more sense current from an input of the power control system than the output of the power control system to, for example, minimize any impact on the output voltage of the power supply. Also, by sensing sense currents, the power control system can eliminate at least one sense resistor used in a voltage sense system.

Figure 1:
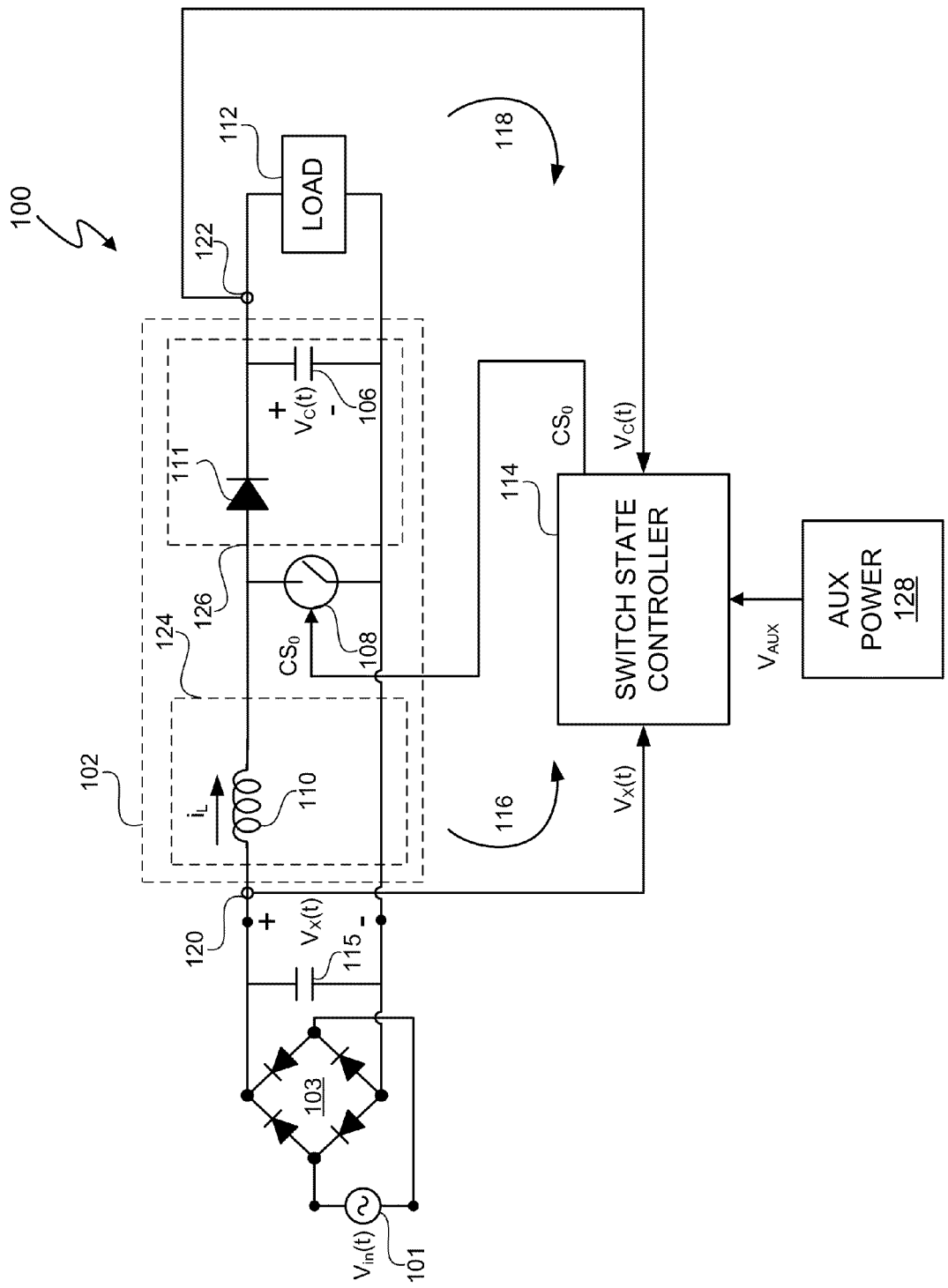
FIG. 1 (labeled prior art) depicts a power control system.
Figure 2:
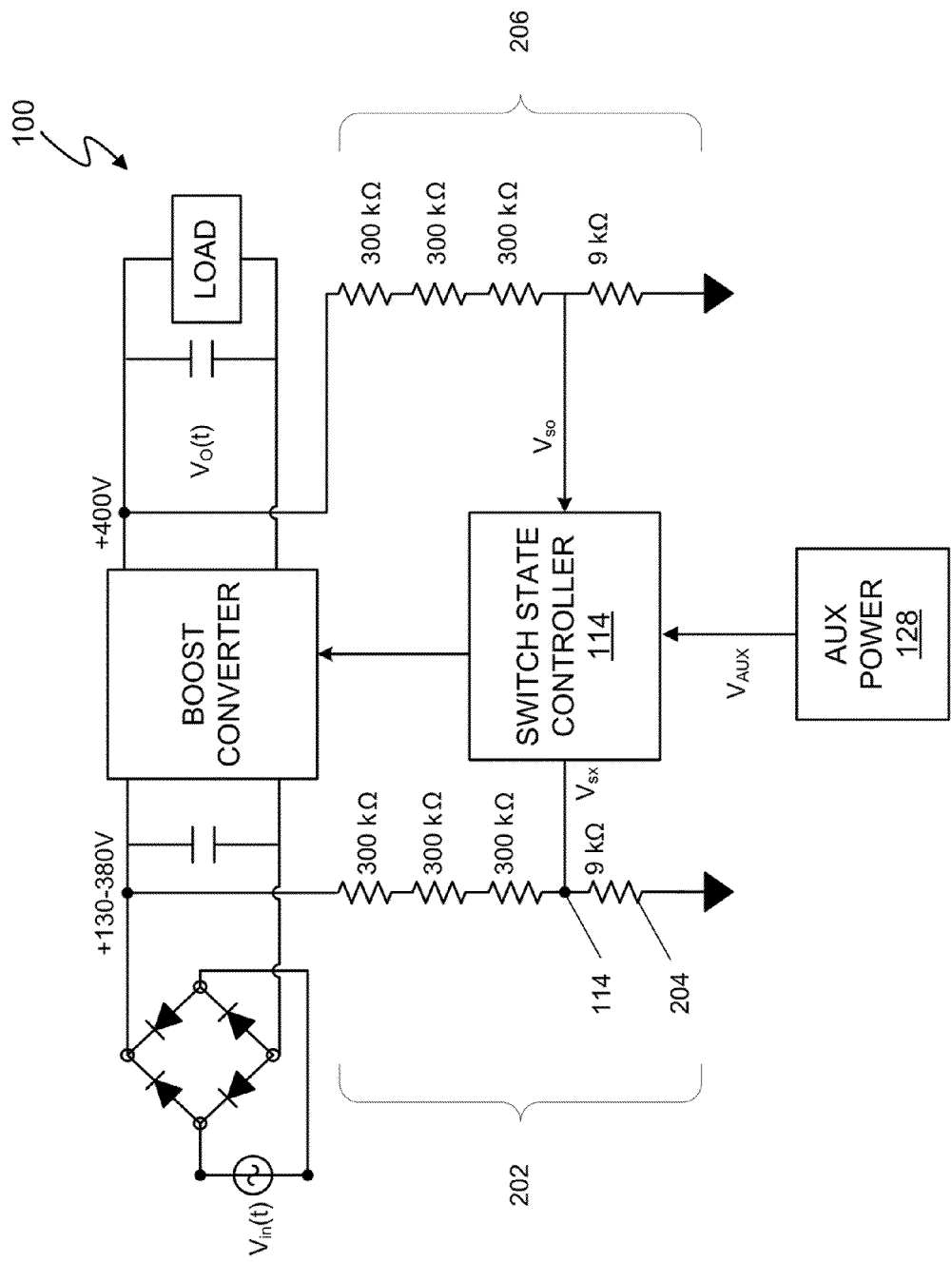
FIG. 2 (labeled prior art) depicts a power control system with voltage sensing.
Figure 3A:
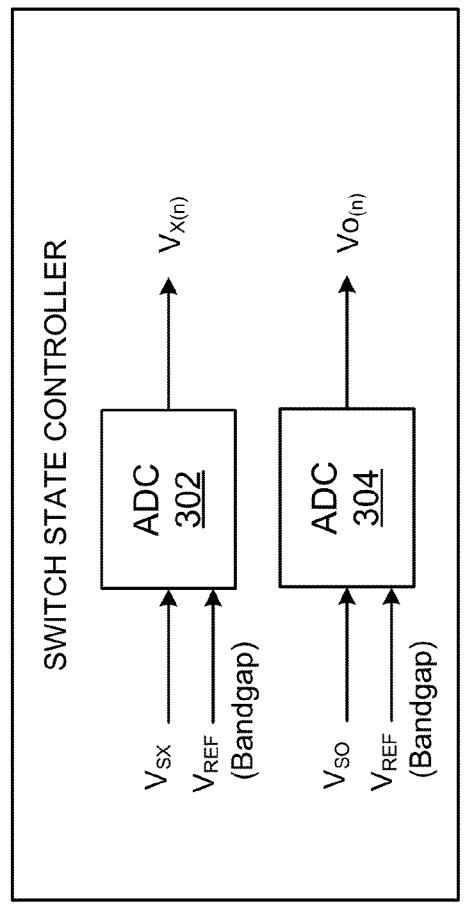
FIG. 3A (labeled prior art) depicts a switch state controller of the power control system of FIG. 2 that includes analog-to-digital converters to convert input and output sense voltages into a digital signal.
Figure 3B:
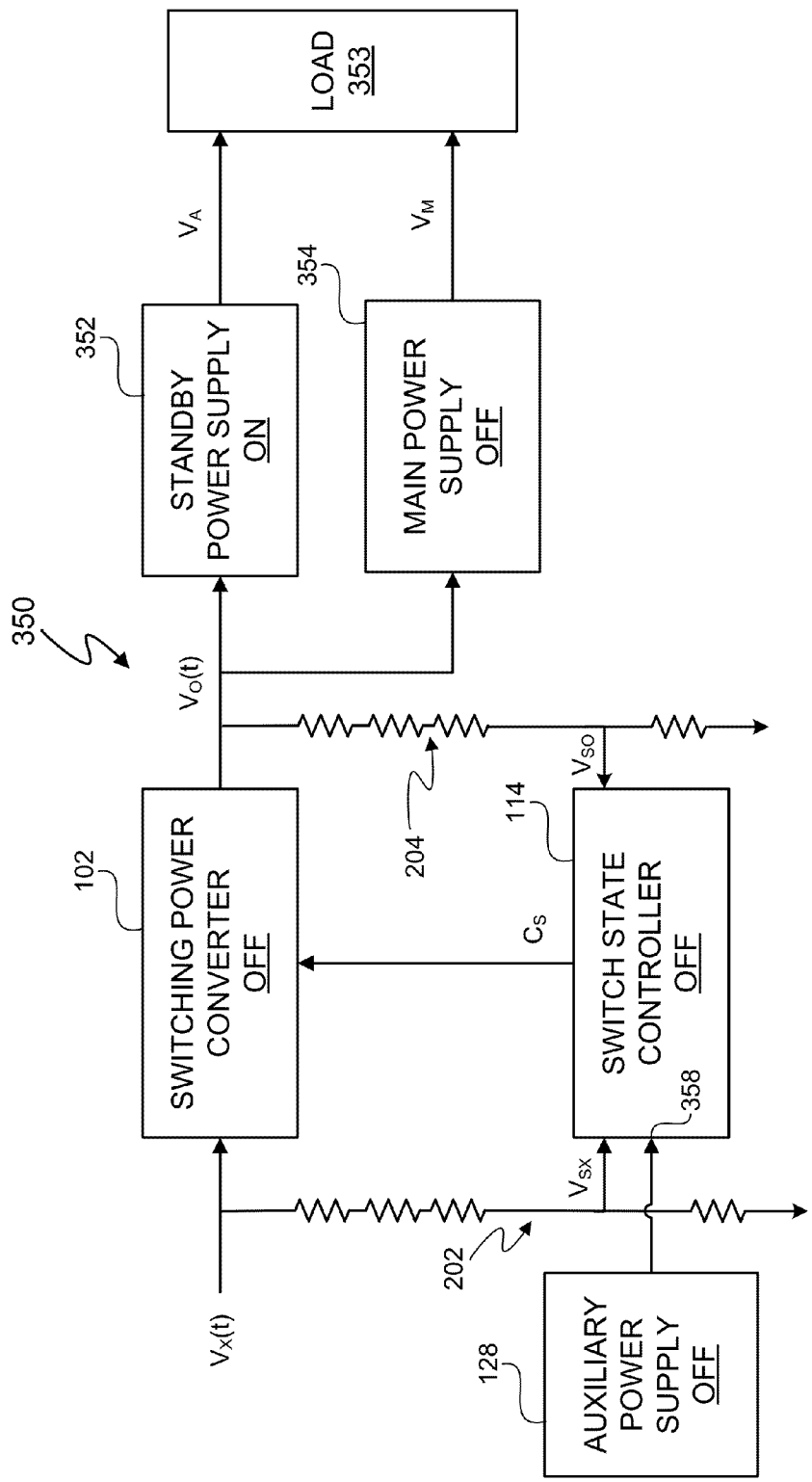
FIG. 3B (labeled prior art) depicts a power supply system.
Figure 4:
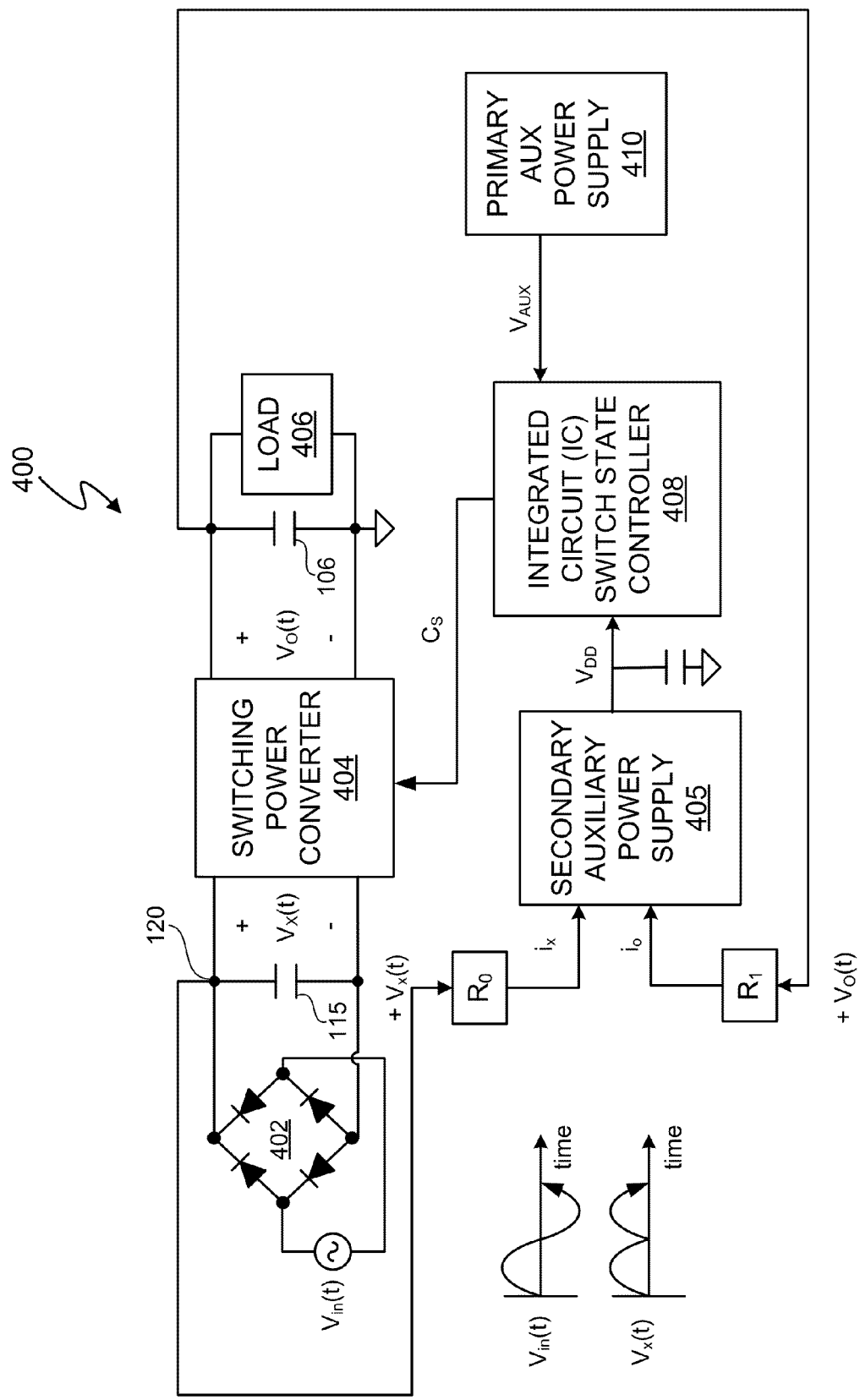
FIG. 4 depicts a power control system with current sensing.

FIG. 4 depicts a power control system 400 with current sensing. A full diode bridge AC rectifier 402 rectifies line input voltage $V_{in}(t)$ to generate a rectified input voltage $V_X(t)$. In at least one embodiment, the input voltage $V_{in}(t)$ is the same as the input voltage $V_{in}(t)$ in FIG. 1. Switching power converter 404 represents one embodiment of a switching power converter that converts the rectified input voltage $V_X(t)$ into a direct current (DC) output voltage $V_O(t)$ for load 406. Switching power converter 404 can be any type of switching power converter, such as a boost converter or a buck converter. The switching power converter 404 includes at least two switching operations, i.e. switching a switch in switching power converter 404, such as switch 108 (FIG. 1) to provide power factor correction and switching a switch in switching power converter 404, such as switch 108 (FIG. 1) to provide regulation of output voltage $V_O(t)$. In at least one embodiment, the output voltage $V_O(t)$ is the same as the output voltage $V_C(t)$ of FIG. 1. The value of the output voltage $V_O(t)$ depends on the input voltage requirements of load 406. In at least one embodiment, the output voltage $V_O(t)$ is approximately 400 V. The switch state controller 408 uses data representing the line input voltage $V_X(t)$ and the output voltage $V_O(t)$ to generate control signal $C_S$. Voltages $V_X(t)$ and $V_O(t)$ are dropped across respective resistances $R_0$ and $R_1$ to generate sense currents $i_X$ and $i_O$. Sense currents $i_X$ and $i_O$ respectively represent the line input voltage $V_X(t)$ and the output voltage $V_O(t)$. As subsequently explained in more detail, a secondary auxiliary power supply 405 generates an operating voltage $V_{DD}$ using one or both of sense currents $i_X$ and $i_O$. Operating voltage $V_{DD}$ can, for example, be supplied to the same external input, such as an IC pin, that receives the operating voltage $V_{AUX}$, to a different external input of switch state controller 408, or to an internal input of switch state controller 408. Thus, when both auxiliary power supply 410 and secondary auxiliary power supply 405 are supplying power, auxiliary power supply 410 and secondary auxiliary power supply 405 can combine to generate the operating voltage for switch state controller 408. In at least one embodiment, the secondary auxiliary power supply 405 is physically separate from switch state controller 408. In at least one embodiment, the secondary auxiliary power supply 405 is included in the same integrated circuit as switch state controller 408. Exemplary resistances $R_0$ and $R_1$ are subsequently discussed in more detail. In at least one embodiment, switch state controller 408 is fabricated as an IC.

The control signal $C_S$ can be generated in any of a variety of ways, such as the exemplary ways described in U.S. patent application Ser. No. 11/967,271, entitled "Power Factor Correction Controller With Feedback Reduction", inventor John L. Melanson, and assignee Cirrus Logic, Inc. ("Melanson I") and U.S. patent application Ser. No. 11/967,272, entitled "Power Factor Correction Controller With Switch Node Feedback", inventor John L. Melanson, and assignee Cirrus Logic, Inc. ("Melanson II"). Melanson I and Melanson II are incorporated herein by reference in their entireties. In at least one embodiment, both the input voltage $V_X(t)$ and the output voltage $V_O(t)$ are sensed using both sense currents $i_X$ and $i_O$. In at least one embodiment, only one or the other of input voltage $V_X(t)$ and output voltage $V_O(t)$ are sensed as currents.

Figure 5:
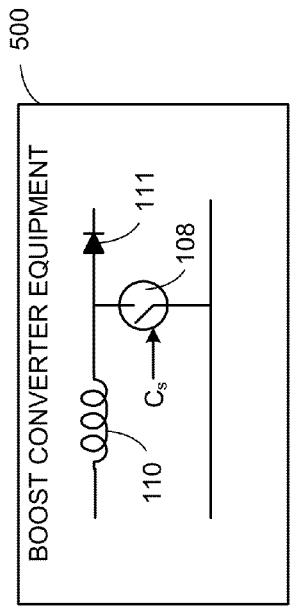
FIG. 5 depicts a boost converter.

FIG. 5 depicts a boost converter 500, which represents one embodiment of switching power converter 404. Boost converter 500 includes inductor 110, diode 111, and switch 108 and functions as described with reference to the same components in FIG. 1.

Figure 6:
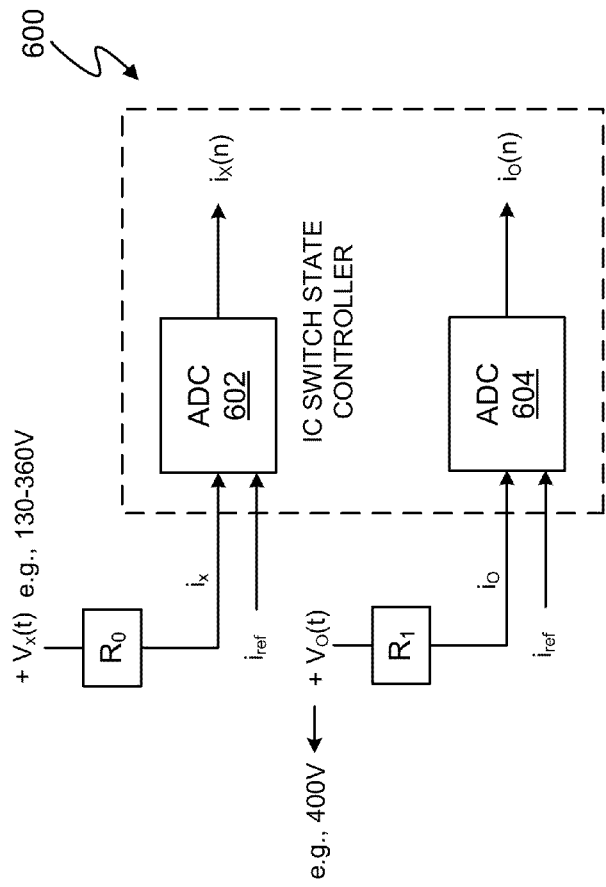
FIG. 6 depicts a current sensing system.

FIG. 6 depicts exemplary current sensing system 600. The input voltage $V_X(t)$ is dropped across resistive impedance $R_0$, and the sense current $i_X$ is provided as an input to ADC 602. The output voltage $V_O(t)$ is dropped across resistive impedance $R_1$, and the sense current $i_O$ is provided as an input to ADC 604. In at least one embodiment, $R_0=R_1$, and, in another embodiment, $R_0$ is less than $R_1$. The implementation and values of resistive impedances $R_0$ and $R_1$ are a matter of design choice and are discussed subsequently in more detail. ADC 602 and ADC 604 convert respective sense currents $i_X$ and $i_O$ into respective digital values $i_X(n)$ and $i_O(n)$. Signals $i_X(n)$ and $i_O(n)$ are used by switch state controller 408 to generate control signal Cs as, for example, described in Melanson I and Melanson II.

Figure 7:
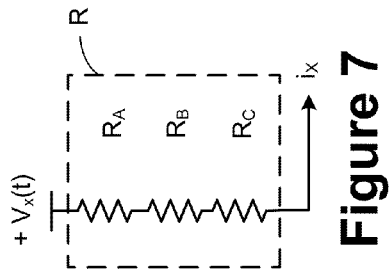
FIG. 7 depicts a resistive impedance for current sensing.

FIG. 7 depicts an exemplary resistive impedance R, which represents an exemplary embodiment of resistive impedances $R_0$ and $R_1$. The voltages across resistive impedances $R_0$ and $R_1$ can be larger than the reliability voltage rating of individual resistors. Accordingly, in at least one embodiment, resistive impedance R is implemented with series coupled resistors $R_A$, $R_B$, and $R_C$ to lower the voltage drop across any particular resistor. Resistive impedance R is depicted with three (3) resistors. However, the exact number is a matter of design choice and depends, for example, on the resistor components used to implement resistive impedance R. Resistive impedance R can be implemented using one or more active components (such as FETs), one or more passive components (such as resistors), or both active and resistive components.

Figure 8:
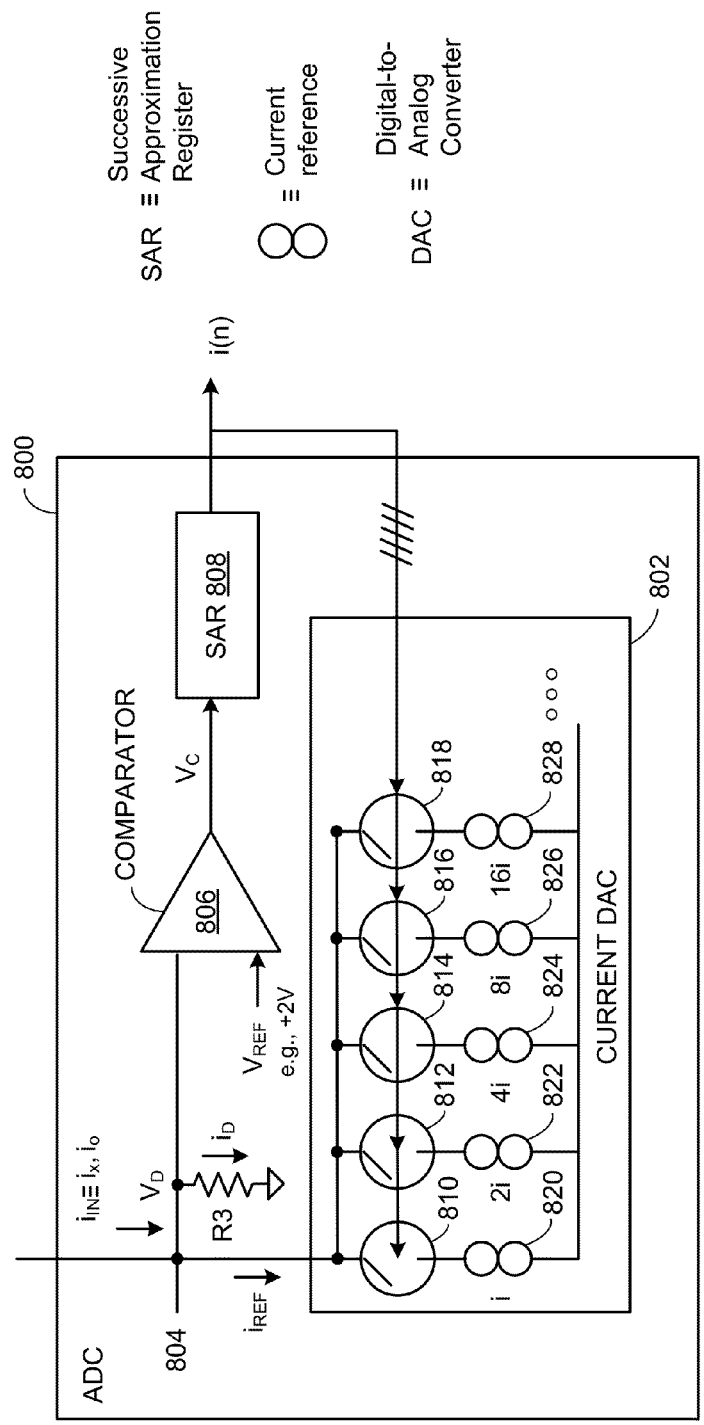
FIG. 8 depicts an analog-to-digital converter.

FIG. 8 depicts ADC 800, which represents an exemplary embodiment of ADC 602 and ADC 604. The input current $i_{in}$ represents sense current $i_X$ for ADC 602 and sense current $i_O$ for ADC 604. Current digital-to-analog converter (DAC) 802 provides a DAC reference current $i_{ref}$ to node 804. The difference current $i_D$ represents a difference between the input current $i_{in}$ and the DAC reference current $i_{REF}$. The difference current $i_D$ generates a voltage $V_D$ across resistor $R_3$, and the voltage $V_D$ is compared to a reference voltage $V_{REF}$, such as +2V by comparator 806. The comparator 806 generates a comparison voltage $V_C$ as an input to successive approximation register (SAR) 808. SAR 808 individually controls the conductivity of switches 810-818 of current DAC 802. In at least one embodiment, the current DAC includes current sources 820-828. In at least one embodiment, the value of the output currents of each successive current source doubles the previous output current value. SAR 808 uses, for example, any well-known logic algorithms to generate a digital output signal i(n) representing the analog input signal $i_{IN}$.

Figure 9:
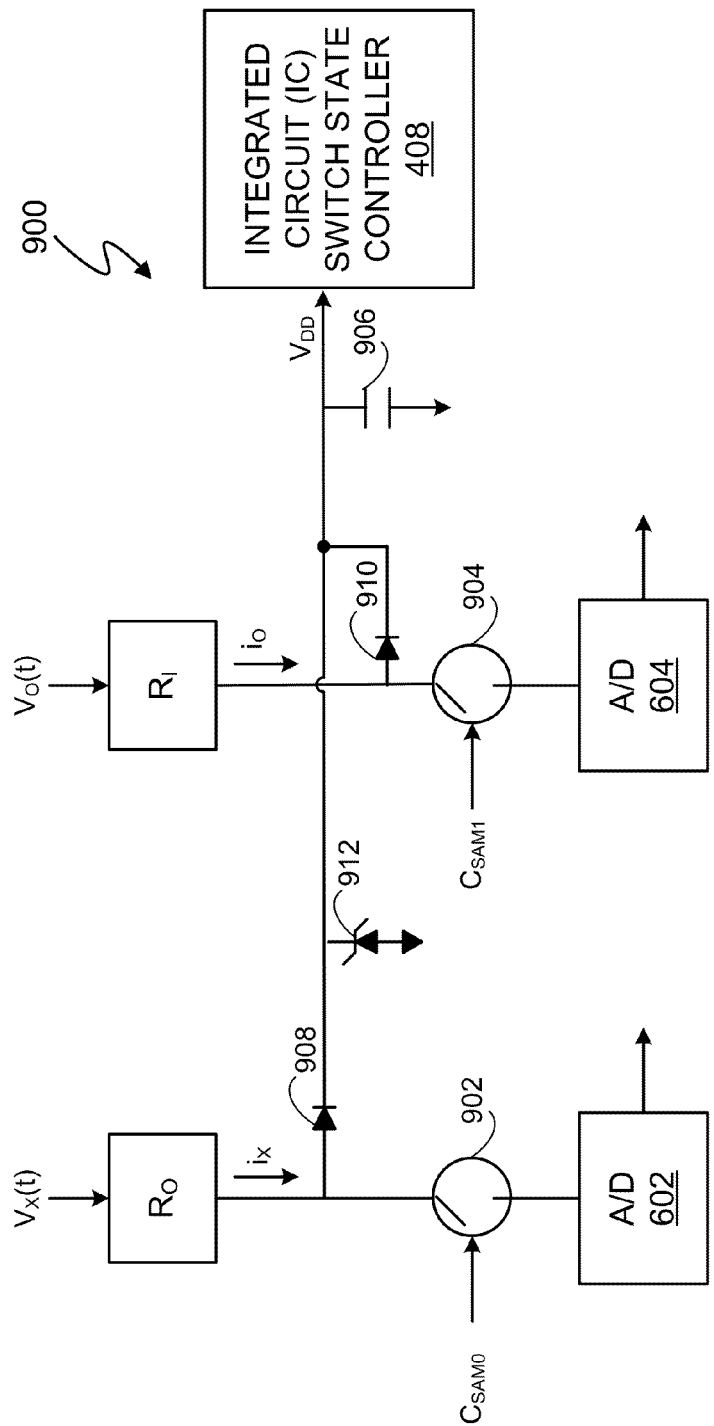
FIG. 9 depicts a time division based secondary auxiliary power supply system.

FIG. 9 depicts a secondary auxiliary power supply system 900 for switch state controller 408. Secondary auxiliary power supply system 900 represents one embodiment of secondary auxiliary power supply system 405. Referring also to FIG. 4, a primary auxiliary power supply 410 provides an operating voltage, auxiliary voltage $V_{AUX}$, to switch state controller 408. Voltage $V_{AUX}$ is, for example, +15V. However, in at least one embodiment, during certain modes of operation of system power control system 400 and during certain events, such as one or more missed cycles of voltage $V_X(t)$, the operating power used by the controller is greater than the power available from the primary auxiliary power supply 410. Thus, during times when auxiliary power supply 410 of power control system 400 is unable to meet the operating power needs of the switch state controller 408 and, thus, is unable to provide an operating voltage to switch state controller 408, such as at initial start-up switch state controller 408 or when exiting stand-by modes, the power available from auxiliary power supply 410 is insufficient to allow switch state controller 408 to operate. The secondary auxiliary power supply system 900 uses the sense currents $i_X$ and $i_O$ to generate a power supply voltage $V_{DD}$ for switch state controller 408. The secondary auxiliary power supply system 900 uses the sense currents $i_X$ and $i_O$ to generate a power supply voltage $V_{DD}$ for switch state controller 408.

In at least one embodiment, the switch state controller 408 uses sense signals $i_X(n)$ and $i_O(n)$ only a small fraction of the time during the operation of power control system 400. Switch state controller 408 closes switches (e.g. n-channel CMOS transistors) 902 and 904 using respective control signals $C_{SAM0}$ and $C_{SAM1}$ to sense the sense currents $i_X$ and $i_O$ from which respective sense current signals $i_X(n)$ and $i_O(n)$ are generated. Switches 902 and 904 are primarily open. While switches 902 and 904 are open, the sense currents $i_O$ and $i_X$ are available to charge capacitor 906 through respective diodes 908 and 910. The voltage developed across capacitor 906 is the power supply voltage $V_{DD}$ to provide power to switch state controller 408. The voltage $V_{DD}$ is regulated to, e.g. +15V, by, for example, a Zener diode 912. In at least one embodiment, the voltage $V_{DD}$ is the primary voltage supply for switch state controller 408 during start-up of switch state controller 408 and supplements the power delivered by auxiliary power supply 410 when auxiliary power supply 410 is not capable of supplying sufficient operating power to switch state controller 408. In at least one embodiment, the power delivered by secondary auxiliary power supply system 900 is proportional to the output power delivered by power control system 400. The secondary auxiliary power supply system 900 can be entirely or partially included within switch state controller 408. For example, in at least one embodiment, all components of the secondary auxiliary power supply system 900 except capacitor 906 are included within switch state controller 408.

In at least one embodiment, secondary auxiliary power supply system 900 draws more current from the input side of switching power converter 404 than the output side. Generally, drawing more power from the input side causes less fluctuation in the output voltage $V_O(t)$. To draw more current from the input side of switching power converter 404, the resistive impedance $R_0$ is set less than the resistive impedance $R_1$. In at least one embodiment, $R_0$ is 10% of $R_1$, i.e. $R_0=0.1 R_1$. The values of resistors $R_0$ and $R_1$ are matters of design choice. Exemplary, respective values for $R_0$ and $R_1$ are 400 kohms and 4 Mohms. The ADC 602 and ADC 604 are still able to provide the sense data to switch state controller 408 to allow switch state controller 408 to properly generate control signal Cs.

Figure 10:
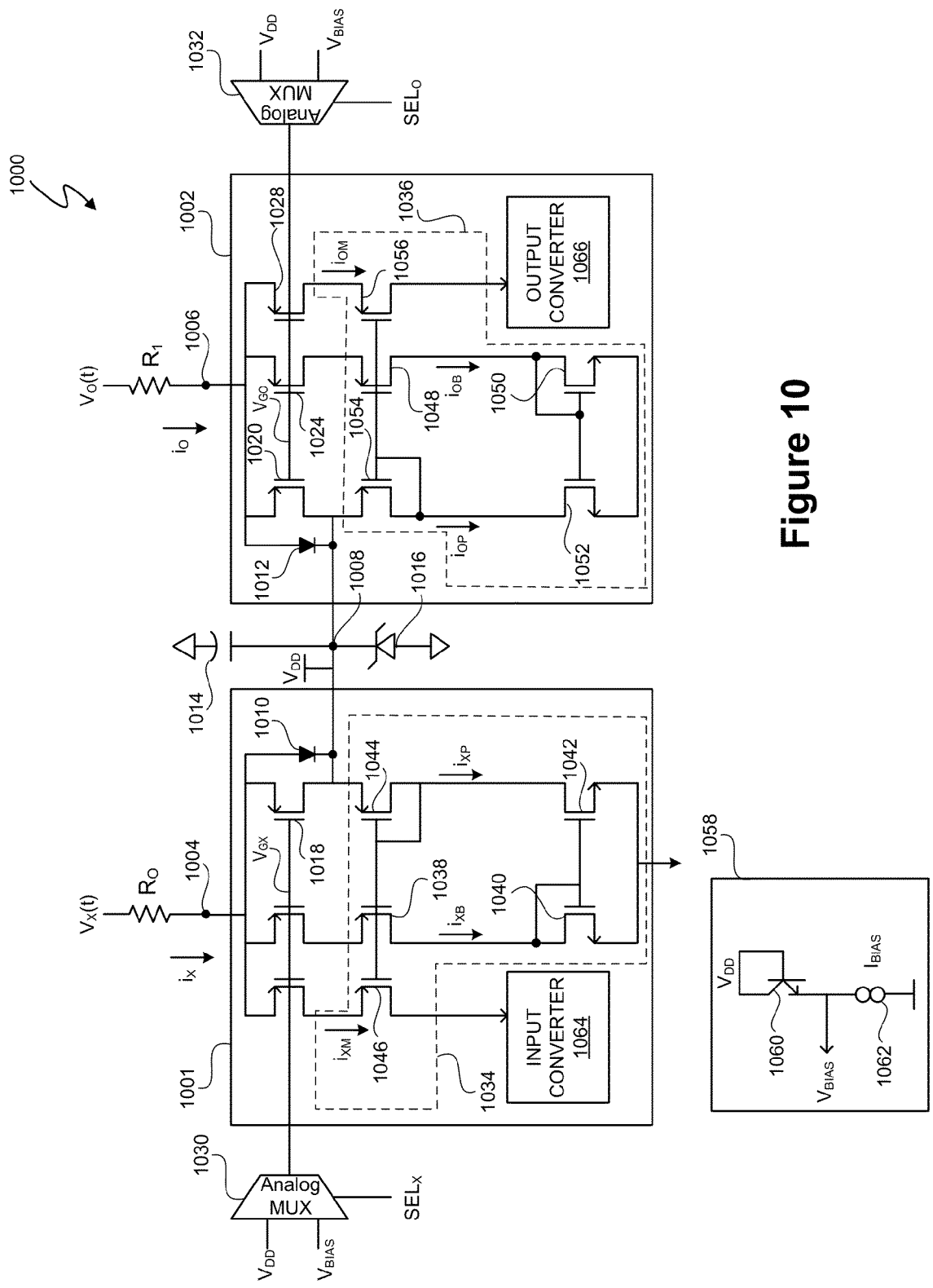
FIG. 10 depicts a proportional division secondary auxiliary power supply system

FIG. 10 depicts secondary auxiliary power supply system 1000, which represents another embodiment of secondary auxiliary power supply 405. Secondary auxiliary power supply system 1000 supplies auxiliary power to switch state controller 408 during at least a portion of the operational time of switch state controller 408, such as when auxiliary power supply 410 cannot provide sufficient power to allow switch state controller 408 to operate. In at least one embodiment, switch state controller 408 uses only a fraction of the energy available from sense currents $i_X$ and $i_O$ to sense respective voltages $V_x(t)$ and $V_O(t)$. In at least one embodiment, at least a portion of the remainder of the energy available from sense currents $i_X$ and $i_O$ is used to power switch state controller 408 when, for example, auxiliary power supply 410 cannot provide sufficient operating power to operate switch state controller 408. Thus, secondary auxiliary power supply system 1000 can divide the energy available from sense currents $i_X$ and $i_O$ to supply operating power to switch state controller 408 and provide feedback sensing of respective voltages $V_x(t)$ and $V_O(t)$.

In at least one embodiment, secondary auxiliary power supply system 1000 has two modes of operation: (1) Start Up Mode and (2) Normal Mode. Referring to FIGS. 4 and 10, in Start Up Mode, auxiliary power supply 410 provides insufficient operating power to switch state controller 408, and secondary auxiliary power supply system 1000 provides operating power to switch state controller 408 by using energy from sense current $i_X$, sense current $i_O$, or both sense currents $i_X$ and $i_O$. Secondary auxiliary power supply system 1000 includes proportional divider circuits 1001 and 1002 to provide operating power to switch state controller 408 during Start Up Mode. During Start Up Mode, all available energy from sense currents $i_X$ and $i_O$ is transferred by respective proportional divider circuits 1001 and 1002 via diodes 1010 and 1012 to charge capacitor 1014. The sense currents $i_X$ and $i_O$ charge capacitor 1014 to voltage $V_{DD}$, thus, raising the voltage of node 1008 to the operational voltage $V_{DD}$ of switch state controller 408. The value of capacitor 1014 is a design choice and, in at least one embodiment, is chosen so that energy transfer from power currents $i_{XP}$ and $i_{OP}$ is sufficient to charge capacitor 1014 to voltage $V_{DD}$ and provide sufficient operating power for switch state controller 408 when auxiliary power supply 410 provides insufficient operating power to switch state controller 408.

During Normal Mode, proportional divider circuits 1001 and 1002 proportionately divide respective sense currents $i_X$ and $i_O$ into (i) respective power currents $i_{XP}$ and $i_{OP}$ to provide power to switch state controller 408, (ii) respective support circuit biasing currents $i_{XB}$ and $i_{OB}$, and (iii) respective measurement currents $i_{XM}$ and $i_{OM}$ to sense respective voltages $V_X(t)$ and $V_O(t)$. Currents $i_{XP}$ and $i_{OP}$ flow through respective p-channel FET transistors 1018 and 1020 to replace charge consumed by switch state controller 408 by charging capacitor 1014 to maintain voltage $V_{DD}$ at node 1008. Biasing currents $i_{XB}$ and $i_{OB}$ flow through p-channel FET transistors 1022 and 1024 to provide biasing to respective proportional divider circuits 1001 and 1002. Measurement currents $i_{XM}$ and $i_{OM}$ flow through p-channel FET transistors 1026 and 1028 to measure respective voltages $V_X(t)$ and $V_O(t)$.

The secondary auxiliary power supply system 1000 includes resistors $R_0$ and $R_1$, which, in at least one embodiment, are respective resistors $R_0$ and $R_1$ as described in conjunction with FIGS. 6 and 7. Resistors $R_0$ and $R_1$ are connected to respective nodes 1004 and 1006. In at least one embodiment, the secondary auxiliary power supply system 1000 is included in the integrated circuit with switch state controller 408, and nodes 1004 and 1006 represent pins of the switch state controller 408. In another embodiment, secondary auxiliary power supply system 1000 is physically separate from switch state controller 408, and node 1008 is connected to a pin of switch state controller 408 to provide power to switch state controller 408.

The gates of transistors 1018, 1022, and 1026 are interconnected, and the gates of transistors 1020, 1024, and 1028 are interconnected. The voltage $V_{GX}$ applied to gates of transistors 1018, 1022, and 1026 controls the flow of current in proportional divider circuit 1001 during Start Up Mode and Normal Mode. The voltage $V_{GO}$ applied to gates of transistors 1020, 1024, and 1028 controls the flow of current in proportional divider circuit 1002 during Start Up Mode and Normal Mode. Voltages $V_{GX}$ and $V_{GO}$ are controlled by the state of respective analog multiplexers 1030 and 1032.

The analog multiplexers 1030 and 1032 are 2 input/1 output analog multiplexers with respective select signals $SEL_X$ and $SEL_O$. The two input signals of analog multiplexers 1030 and 1032 are voltages $V_{DD}$ and $V_{BIAS}$. The respective outputs of analog multiplexers 1030 and 1032 are voltages $V_{GX}$ and $V_{GO}$. When not operating in Normal Mode, the state of select signals $SEL_X$ and $SEL_O$ is set to select voltage $V_{DD}$. Thus, during Start Up Mode, voltages $V_{GX}$ and $V_{GO}$ equal voltage $V_{DD}$. Driving the gates of transistors 1018, 1022, and 1026 and 1020, 1024, and 1028 to voltage $V_{DD}$ effectively turns transistors 1018, 1022, and 1026 and 1020, 1024, and 1028 "OFF", i.e. nonconductive. Sense currents $i_X$ and $i_O$ charge respective nodes 1004 and 1006. Once the voltage at nodes 1004 and 1006 exceeds voltage $V_{DD}$ by the forward bias voltage $V_{BE}$ of diodes 1010 and 1012, diodes 1010 and 1012 conduct. With transistors 1018, 1022, and 1026 and 1020, 1024, and 1028 "off" and diodes 1010 and 1012 "ON", i.e. conducting, power current $i_{XP}$ equals sense current $i_X$, and power current $i_{OP}$ equals sense current $i_O$. The power currents $i_{XP}$ and $i_{OP}$ provided to node 1008 charge capacitor 1014 to voltage $V_{DD}$. Zener diode 1016 limits the voltage across capacitor 1014 to voltage $V_{DD}$.

During Start Up Mode, transistors 1018, 1022, and 1026 and 1020, 1024, and 1028 remain OFF since the gate-to-source voltages $V_{GS}$ of transistors 1018, 1022, and 1026 and 1020, 1024, and 1028 is below $V_{TH}+V_{ON}$. "$V_{TH}$" represents the threshold voltage of transistors 1018, 1022, and 1026 and 1020, 1024, and 1028, and "$V_{ON}$" represents the voltage above the threshold voltage $V_{TH}$. In at least one embodiment, the threshold voltage $V_{TH}$ is at least 0.7 V, and voltage $V_{ON}$ is 100-200 mV. If $(V_{TH}+V_{ON})<V_{BE}$, transistors 1018, 1022, and 1026 and 1020, 1024, and 1028 are conductive, and the sense currents $i_X$ and $i_O$ will be shared between respective transistors 1018, 1022, and 1026 and 1020, 1024, and 1028 and respective diodes 1010 and 1012. In at least one embodiment, the geometries of transistors 1018, 1022, and 1026, transistors 1020, 1024, and 1028, and diodes 1010 and 1012 cause respective power currents $i_{XP}$ and $i_{OP}$ to exceed measurement currents $i_{XM}$ and $i_{OM}$ and bias currents $i_{XB}$ and $i_{OB}$. In at least one embodiment, respective power currents $i_{XP}$ and $i_{OP}$ are approximately 90% of sense currents $i_X$ and $i_O$.

During Normal Mode, the state of multiplexer select signals $SEL_X$ and $SEL_O$ selects voltage $V_{BIAS}$ as the voltage for gate voltages $V_{GX}$ and $V_{GO}$. In at least one embodiment, the value of voltage $V_{BIAS}$ causes sense currents $i_X$ and $i_O$ to only flow through transistors 1018, 1022, and 1026 and 1020, 1024, and 1028. The current flowing through transistors 1018, 1022, and 1026 and 1020, 1024, and 1028 is proportionally split between respective power currents $i_{XP}$ and $i_{OP}$, bias currents $i_{XB}$ and $i_{OB}$, and measurement currents $i_{XM}$ and $i_{OM}$.

The current division proportions are a function of the physical dimensions of respective transistors 1018, 1022, and 1026 and 1020, 1024, and 1028. In at least one embodiment, the ratio of physical geometries and, thus, the current division proportions allows a majority of the sense currents $i_X$ and $i_O$ to flow through respective transistors 1018 and 1020 to continue supplying energy to charge capacitor 1014 at node 1008. The remaining current, i.e. $i_X$-$i_{XP}$, in proportional divider circuit 1001 is divided between transistors 1022 and 1026. The remaining current, i.e. $i_O$-$i_{OP}$, in proportional divider circuit 1002 is divided between transistors 1024 and 1028. In at least one embodiment, the physical dimensions of transistor 1018 is greater than the physical dimensions of transistor 1026, and the physical dimensions of transistor 1026 is greater than the physical dimensions of transistor 1022. Thus, the measurement current $i_{XM}$ is greater than the bias current $i_{XB}$. In at least one embodiment, the physical dimensions of transistor 1020 is greater than the physical dimensions of transistor 1028, and the physical dimensions of transistor 1028 is greater than the physical dimensions of transistor 1024. Thus, the measurement current $i_{OM}$ is greater than the bias current $i_{OB}$.

The accuracy of current division by proportional divider circuits 1001 and 1002 is determined by the ability of the respective drain bias regulators 1034 and 1036 to maintain the drains of respective transistors 1022 and 1026 at voltage $V_{DD}$. Bias current $i_{XB}$ flows through p-channel FET 1038 to the diode connected n-channel FET 1040. Transistor 1040 along with n-channel FET 1042 form a current mirror whose output current $i_{XP}$ at the drain of transistor 1042 equals a scaled version of bias current $i_{XB}$. The drain current of transistor 1042 is presented to the diode connected p-channel FET 1044 to generate a cascode bias for driving transistor 1038 and p-channel FET 1046. The bias forces the drain voltages of transistors 1022 and 1026 to voltage $V_{DD}$, which matches the drain voltage of transistor 1018. Bias current $i_{OB}$ flows through p-channel FET 1048 to the diode connected n-channel FET 1050. Transistor 1050 along with n-channel FET 1052 form a current mirror whose output current $i_{OP}$ at the drain of transistor 1052 equals a scaled version of bias current $i_{OB}$. The drain current of transistor 1052 is presented to the diode connected p-channel FET 1054 to generate a cascode bias for driving transistor 1048 and p-channel FET 1056. The bias forces the drain voltages of transistors 1024 and 1028 to voltage $V_{DD}$, which matches the drain voltage of transistor 1020. Thus, drain bias regulators 1034 and 1036 provide the voltages used to cause respective proportional divider circuits 1001 and 1002 to proportionately divide respective sense currents $i_X$ and $i_O$ into power, measurement, and support bias currents.

Voltage bias regulator 1058 generates voltage $V_{BIAS}$ during the Normal Mode so that all of sense currents $i_X$ and $i_O$ flow through respective transistors 1018, 1022, and 1026 and 1020, 1024, and 1028, i.e. $i_X = i_{XP} + i_{XB} + i_{XM}$ and $i_O = i_{lp} + i_{OB} + i_{OM}$. To reverse bias diodes 1010 and 1012 during Normal Mode, the respective voltages at nodes 1004 and 1006 is less than voltage $V_{BE}$ of diodes 1010 and 1012 with reference to voltage $V_{DD}$. To achieve current flow through transistors 1018, 1022, and 1026 and 1020, 1024, and 1028, the source to drain voltage of transistors 1018, 1022, and 1026 and 1020, 1024, and 1028 is larger than voltage $V_{ON}$, and voltage $V_{ON}$ is the voltage above the threshold voltage $V_{TH}$ of transistors 1018, 1022, and 1026 and 1020, 1024, and 1028.

Typically, voltage $V_{ON}$ is 100-200 mV. Thus, ideally, voltage $V_{BIAS}$ is set equal to the threshold voltage $V_{TH}$ of transistors 1018, 1022, and 1026 and 1020, 1024, and 1028. However, in reality, the difference between the threshold voltage $V_{TH}$ and the diode forward bias voltage $V_{BE}$ is generally <+/−200 mV. If the voltage $V_{ON}$ is greater than or equal to 100 mV and less than or equal to 200 mV, then a bipolar device of junction diode referenced to voltage $V_{DD}$ can be used to generate voltage $V_{BIAS}$. The bias voltage $V_{BIAS}$ is, thus, $V_{DD}$-$V_{BE}$. When the voltage $V_{BIAS}$ is applied to the gates of transistors 1018, 1022, and 1026 and 1020, 1024, and 1028, the source of transistors 1018, 1022, and 1026 and 1020, 1024, and 1028 is forced to $V_{DD}$-$V_{BE}$+$V_{TH}$+$V_{ON}$.

Thus, in at least one embodiment, the voltage bias regulator 1058 includes a diode connected bipolar junction transistor 1060 with an emitter connected to a current source 1062. The voltage $V_{BIAS}$ is the emitter voltage of transistor 1060.

Intput converter 1064 receives measurement current $i_{XM}$ and converts the measurement current $i_{XM}$ into a signal representing voltage $V_X(t)$. Output converter 1064 can be any conversion circuit such as ADC 800, a current to voltage converter, or an analog conversion circuit. Output converter 1066 receives measurement current $i_{OM}$ and converts the measurement current $i_{OM}$ into a signal representing voltage $V_O(t)$. Output converter 1066 can be any conversion circuit such as ADC 800, a current to voltage converter, or an analog conversion circuit.

Figure 11:
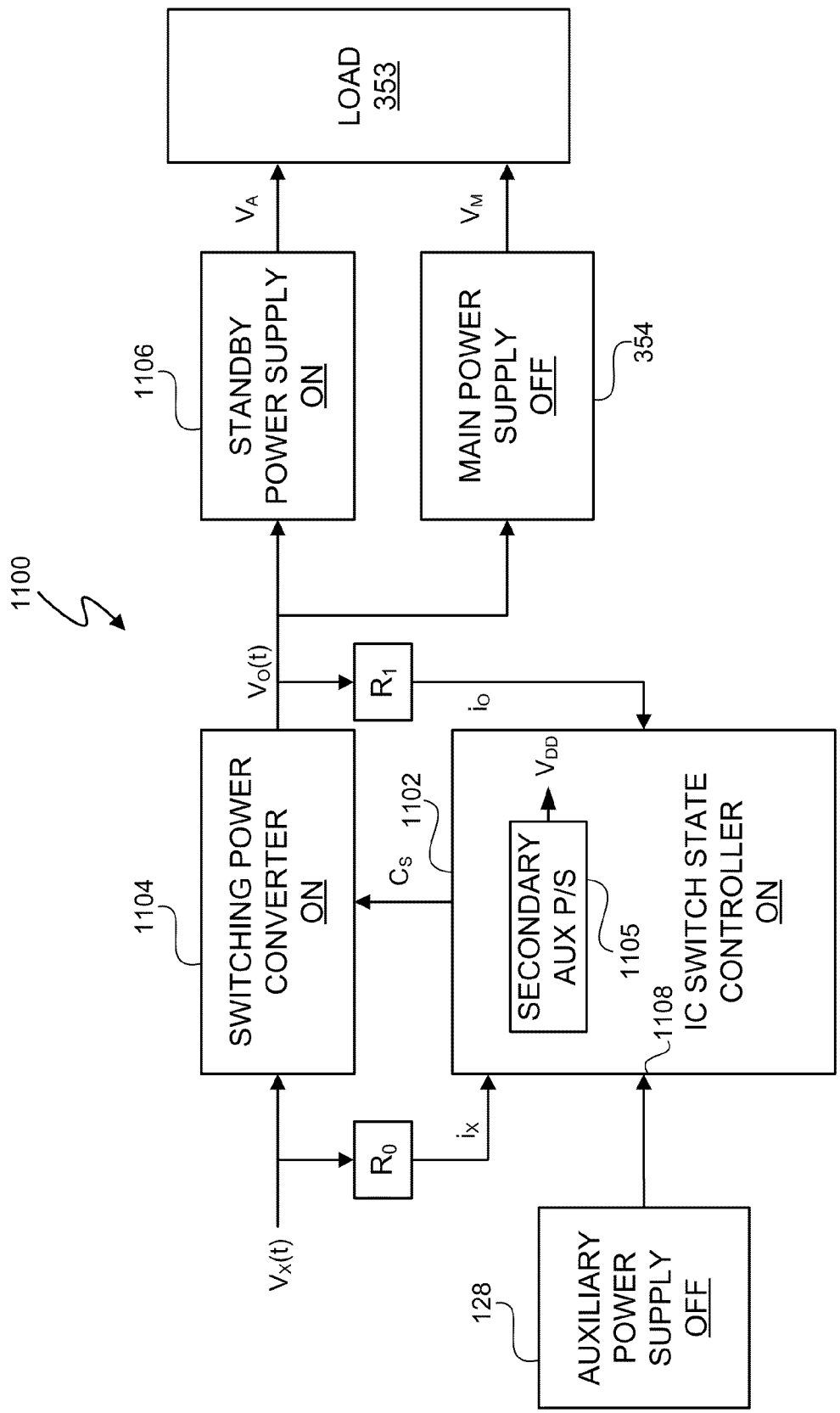
FIG. 11 depicts a power supply system that uses one or more sense currents to supply power to an integrated circuit switch state controller at least when the power supply system is operating in standby-mode.

FIG. 11 depicts one embodiment of a power supply system 1100 that uses one or more sense currents $i_X$ and $i_O$, to supply power to switch state controller 1102 at least when power supply system 1100 is operating in standby-mode or in other situations when auxiliary power supply 410 does not provide sufficient operating power switch state controller 1102. For example, the input voltage $V_X(t)$ may miss one or more cycles causing auxiliary power supply 410 to provide insufficient operating power to switch state controller 1102. Switch state controller 1102 receives power from auxiliary power supply 410 via an input 1108. Input 1108 can be any type of connection capable of allowing auxiliary power supply 410 to provide power to switch state controller 1102. The power supply system 1100 includes a switching power converter 1104, such as switching power converter 404, that, in at least one embodiment, provides power factor correction and boosts the input voltage $V_x(t)$ to output voltage $V_O(t)$. In at least one embodiment, input and output capacitors, such as respective capacitors 115 and 106 (FIG. 4), are included in power supply system 1100 but not shown in FIG. 11 for clarity. Standby secondary auxiliary power supply 1105 supplies, for example, up to 5 W of power to load 353 while load 353 is in standby. Secondary auxiliary power supply 1105 generates power supply voltage $V_{DD}$ for operating switch state controller 1102 during situations when primary auxiliary power supply 410 provides insufficient operating power to switch state controller 1102.

The secondary auxiliary power supply 1105 enables switch state controller 1102 to operate during standby mode. Switch state controller 1102 is able to operate during standby mode (and in other situations when auxiliary power supply 410 provides insufficient operating power to switch state controller 1102), and switching power converter 1104 maintains an approximately constant output voltage $V_O(t)$. With switch state controller 1102 operating in standby mode and switching power converter 1104 maintaining an approximately constant voltage $V_O(t)$, standby power supply 1106 can be designed to operate from an approximately constant input voltage and, thus, can be designed more cost effectively than standby power supplies designed to operate from a wider range of input voltages.

The particular secondary auxiliary power supply 1105 for developing the auxiliary input voltage $V_{DD}$ to power the switch state controller 1102, at least during standby-mode, is a matter of design choice. In at least one embodiment, secondary auxiliary power supply 1105 is secondary auxiliary power supply system 900. In another embodiment, secondary auxiliary power supply 1105 is secondary auxiliary power supply system 1000. Secondary auxiliary power supply 1105 can be included as part of the IC containing switch state controller 1102 or can be physically separate from switch state controller 1102 and connected to switch state controller 1102 to provide voltage $V_{DD}$ (FIGS. 9 and 10). Thus, secondary auxiliary power supply 1105 can be implemented internally, externally, or a combination of internally and externally to the switch state controller 1102.

Each of the components 354, 410, 1102, 1104, and 1106 includes an underlined state, i.e. ON or OFF, that represents the state of the components 354, 410, 1102, 1104, and 1106 in standby mode. Because the sense currents $i_X$ and $i_O$ are available in standby-mode, the switch state controller 1102 can remain ON. In standby-mode, the power factor correction control switch (such as switch 108 in FIG. 1) of switching power converter 1104 has a very small pulse width, and, thus, does not need to conduct very often. For example, the duty cycle of control signal Cs is very small during standby-mode and low power operation. The duty cycle is, for example, nearly 0% in standby-mode. Because of the low duty cycle of control signal Cs in standby-mode, the switch state controller 1102 requires less power to operate in standby-mode. Because of the low power requirement of switch state controller 1102 during standby-mode, the power derived from the sense current $i_X$, $i_O$, or $i_X$ and $i_O$ (i.e. sense currents $i_X$ and/or $i_O$) provides sufficient power to allow switch state controller 1102 to operate during standby-mode. During a missed cycle of input voltage $V_X(t)$, an output capacitor on an output of the switching power converter 1104 (such as capacitor 106 of FIG. 4) is able to hold the output voltage $V_O(t)$ at an approximately constant value for at least several consecutive missed cycles. Missed cycles are generally sporadically dispersed among the cycles of input voltage $V_X(t)$. Because the sense current $i_O$ is derived from the output voltage $V_O(t)$, sense current $i_O$ is available during missed cycles of input voltage $V_X(t)$.

Because switch state controller 1102 and switching power converter 1104 operate during standby-mode, the standby power supply 1106 can be designed to operate efficiently with a constant input voltage $V_O(t)$ supply.

The secondary auxiliary power supply 1105 for developing the auxiliary input voltage $V_{DD}$ to power the switch state controller 1102, at least during standby-mode, is a matter of design choice. In at least one embodiment, secondary auxiliary power supply 1105 is secondary auxiliary power supply system 900. In another embodiment, secondary auxiliary power supply 1105 is secondary auxiliary power supply system 1000. The secondary auxiliary power supply 1105 can be implemented internally, externally, or a combination of internally and externally to the switch state controller 1102.

Figure 12:
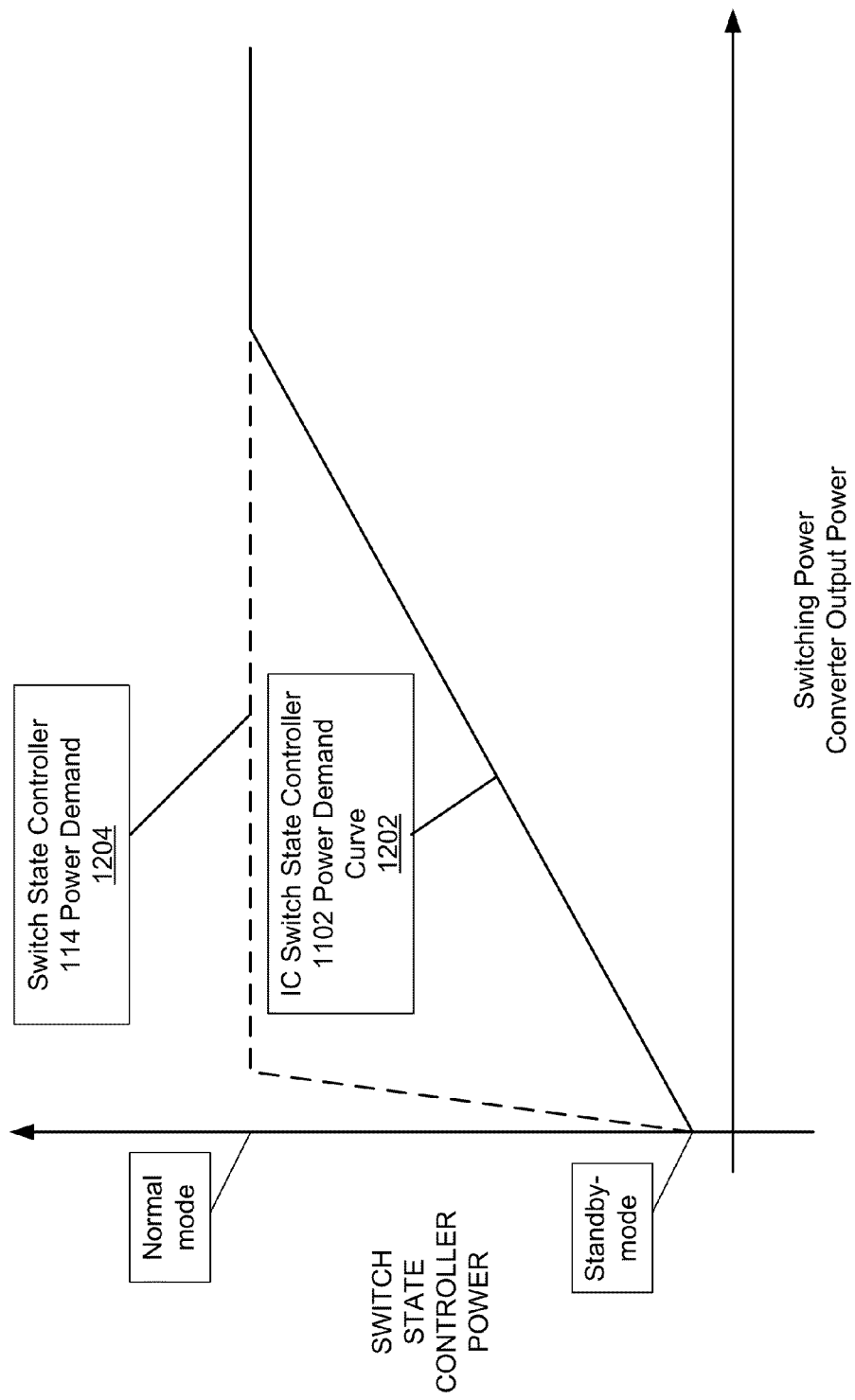
FIG. 12 depicts an exemplary graphical curve showing sense current power plotted versus output power of a switching power converter.

FIG. 12 depicts an exemplary graphical curve 1202 showing switch state controller power plotted versus output power of switching power converter 1104. The exemplary switch state controller power curve 1202 represents power provided by secondary auxiliary power supply 1105 from sense currents $i_X$ and/or $i_O$ and the auxiliary power supply 410 as the output power supplied by the switching power converter 1104 changes. As the output power supplied by the switching power converter 1104 increases, more power is supplied to the switch state controller 1102 from the auxiliary power supply 410 to allow the switch state controller 1102 to increase the pulse width of the control signal $C_S$, and, thus, increase the power supplied by switching power converter 1104. Thus, the power supplied to the switch state controller 1102 by the auxiliary power supply 410 is proportional to the output power supplied by switching power converter 1104. The exemplary switch state controller power curve 1202 indicates that the sense currents $i_X$ and/or $i_O$ can provide sufficient energy to switch state controller 1102 to allow switch state controller 1102 to operate during times of low power demand on switching power converter 1104. The power demand curve 1204 of switch state controller 1102 indicates the power demand of the switch state controller 1102 from standby mode to normal operation mode.

Thus, feedback input and/or output currents are available during standby-mode of the power supply, and, thus, the switch state controller enables the switching power converter to supply an approximately constant output voltage to a standby power supply.

Although the present invention has been described in detail, it should be understood that various changes, substitutions and alterations can be made hereto without departing from the spirit and scope of the invention.

What is claimed is:

1. An apparatus comprising:
    a controller, wherein the controller is configured to:
        operate during at least one controller operational mode from an operating voltage generated from at least a first portion of a first sense current, wherein the first sense current is resistively derived from and senses at least one of: (i) a rectified input line voltage and (ii) an output voltage of a switching power converter, wherein the at least one controller operational mode comprises a start-up-mode of the controller;
        receive at least a second portion of the first sense current concurrently with the first portion of the first sense current; and
        use the second portion of the first sense current to control a switching operation of the switching power converter.

2. The apparatus of claim 1 wherein the switching operation of the switching power converter is a member of a group consisting of: (i) operating a switch of the switching power converter to provide power factor correction and (ii) operating the switch of the switching power converter to regulate an output voltage of the switching power converter.

3. The apparatus of claim 1 wherein the controller is configured to operate from the operating voltage generated from at least the first portion of the first sense current when a primary auxiliary power supply provides insufficient power to allow the controller to at least control an output voltage of the switching power converter.

4. The apparatus of claim 1 wherein the controller is further configured to cause the switching power converter to generate an approximately constant output voltage when the controller operates from the operating voltage generated from at least the first portion of the first sense current.

5. The apparatus of claim 1 wherein the controller is further configured to use at least the second portion of the first sense current to control at least one of (i) power factor correction of the switching power converter and (ii) regulation of an output voltage of the switching power converter.

6. The apparatus of claim 1 further comprising:
    a secondary auxiliary power supply having a first input to receive at least the second portion of the first sense current, wherein the secondary auxiliary power supply system is configured to generate the operating voltage from at least the second portion of the first sense current.

7. The apparatus of claim 6 wherein the secondary auxiliary power supply and the controller comprise components included in an integrated circuit.

8. The apparatus of claim 1 wherein the controller is configured to operate from an operating voltage derived from at least the first sense current and derived from at least a second sense current, wherein the second sense current is resistively derived from a second voltage sense of the switching power converter.

9. The apparatus of claim 8 wherein the first sense current senses an input voltage to the switching power converter and the second sense current senses an output voltage of the switching power converter.

10. The apparatus of claim 8 wherein the controller includes a first converter to convert the first portion of the first sense current into data representing the input voltage to the switching power converter and a second converter to convert a second portion of the second sense current into data representing the output voltage of the switching power converter, wherein the apparatus further comprises:
a secondary auxiliary power supply, and the secondary auxiliary power supply comprises:
a first sense current proportional divider circuit coupled to the controller to provide the first portion of the first sense current to the first converter for sensing the input voltage of the switching power converter; and
a second sense current proportional divider circuit coupled to the controller to provide the second portion of the second sense current to the second converter for sensing the output voltage of the switching power converter;
wherein the first and second proportional divider circuits are configured to generate the operating voltage from the first portion of the first sense current and the second portion of the second sense current.

11. The apparatus of claim 8 the controller comprises:
a first converter to convert the second portion of the first sense current into data representing the input voltage of the switching power converter; and
a second converter to convert a second portion of the second sense current into data representing the output voltage of the switching power converter; and
the apparatus further comprises a secondary auxiliary power supply, and the second auxiliary apparatus comprises:
first circuitry coupled to the controller to provide the first sense current to the first converter for sensing the input voltage of the switching power converter and to at least contribute to generation of the operating voltage for the controller during non-overlapping periods of time; and
second circuitry coupled to the controller to provide the second sense current to the second converter for sensing the output voltage of the switching power converter and to at least contribute to generation of the operating voltage for the controller during non-overlapping periods of time.

12. The apparatus of claim 1 further comprising:
a secondary auxiliary power supply having a first input to receive at least the second portion of the first sense current and a second portion of a second sense current, wherein the second sense current is resistively derived from a second voltage sense of the switching power converter and the secondary auxiliary power supply system is configured to generate the operating voltage from at least the second portions of the first and second sense currents.

13. The apparatus of claim 12 further comprising:
a first resistive circuit, coupled between the input of the switching power converter and the second auxiliary power supply, to provide resistance to the first sense current; and
a second resistive circuit, coupled between an output of the switching power converter and the second auxiliary power supply, to provide resistance to the second sense current.

14. The apparatus of claim 13 wherein the second resistive circuit has a greater resistance than the first resistive circuit.

15. The apparatus of claim 1 wherein the first sense current is a member of a group consisting of: a sense current derived from an input voltage to the switching power converter and a sense current derived from the output voltage of the switching power converter.

16. The apparatus of claim 1 further comprising the switching power converter, wherein the switching power converter is coupled to the controller.

17. The apparatus of claim 16 wherein the switching power converter is a member of a group consisting of: a boost converter and a buck converter.

18. A method comprising:
operating a controller during at least one controller operational mode from an operating voltage generated from at least a first portion of a first sense current, wherein the first sense current is resistively derived from and senses at least one of: (i) a rectified input line voltage and (ii) an output voltage of a switching power converter, wherein the at least one controller operational mode comprises a start-up-mode of the controller;
receiving in the controller at least a second portion of the first sense current concurrently with the first portion of the first sense current; and
using the second portion of the first sense current to control a switching operation of the switching power converter.

19. The method of claim 18 wherein the switching operation of the switching power converter is a member of a group consisting of: operating a switch of the switching power converter to provide power factor correction and operating the switch of the switching power converter to regulate an output voltage of the switching power converter.

20. The method of claim 18 further comprising:
operating the controller to cause the switching power converter to generate an approximately constant output voltage when the controller operates from the operating voltage generated from at least the first portion of the first sense current.

21. The method of claim 18 operating the controller further comprises:
operating the controller from the operating voltage generated from at least the first portion of the first sense current when a primary auxiliary power supply provides insufficient power to allow the controller to at least control an output voltage of the switching power converter.

22. The method of claim 21 wherein the primary auxiliary power supply provides insufficient power to allow the controller to at least control an output voltage of the switching power converter during standby-mode of the power supply system.

23. The method of claim 18 wherein operating the controller further comprises:
operating the controller during at least one controller operational mode from an operating voltage generated from at least a first portion of the first sense current and generated from a first portion of a second sense current, wherein the second sense current is resistively derived from a second voltage sense of a switching power converter.

24. The method of claim 23 wherein operating the controller from the operating voltage generated from the first and second sense currents comprises operating the controller from the operating voltage generated from the first sense current and from a second sense current at least when a primary auxiliary power supply provides insufficient power to allow the controller to at least control an output voltage of the switching power converter.

25. The method of claim 23 further comprising:
providing the first sense current to the first converter for sensing the input voltage of the switching power converter and to at least contribute to generation of the operating voltage for the controller during non-overlapping periods of time; and
providing the second sense current to the second converter for sensing the output voltage of the switching power converter and to at least contribute to generation of the operating voltage for the controller during non-overlapping periods of time.

26. The method of claim 23 wherein the first sense current has a greater magnitude than the second sense current.

27. The method of claim 23 further comprising:
providing a second portion of the first sense current to a first converter for sensing the input voltage of the switching power converter while providing a first portion of the first sense current to a secondary auxiliary power supply system for generating the operating voltage.

28. The method of claim 23 wherein the first sense current is a member of a group consisting of: a sense current derived from an input voltage to the switching power converter and a sense current derived from the output voltage of the switching power converter.

29. The method of claim 18 further comprising:
determining a switch control signal to control a switch of the switching power converter, wherein the switch controls input current to the switching power converter.

30. An apparatus comprising:
means for operating a controller during at least one controller operational mode from an operating voltage generated from at least a first portion of a first sense current, wherein the first sense current is resistively derived from and senses at least one of: (i) a rectified input line voltage and (ii) an output voltage of a switching power converter, wherein the at least one controller operational mode comprises a start-up-mode of the controller;
means for receiving in the controller at least a second portion of the first sense current concurrently with the first portion of the first sense current; and
means for using the second portion of the first sense current to control a switching operation of the switching power converter.

* * * * *